March 23, 1948. L. L. JOHNSTON 2,438,218
MOLDING MACHINE
Filed July 6, 1944 17 Sheets-Sheet 1

INVENTOR
Loyal L. Johnston

March 23, 1948.    L. L. JOHNSTON    2,438,218
MOLDING MACHINE
Filed July 6, 1944    17 Sheets-Sheet 5

INVENTOR
Loyal L. Johnston

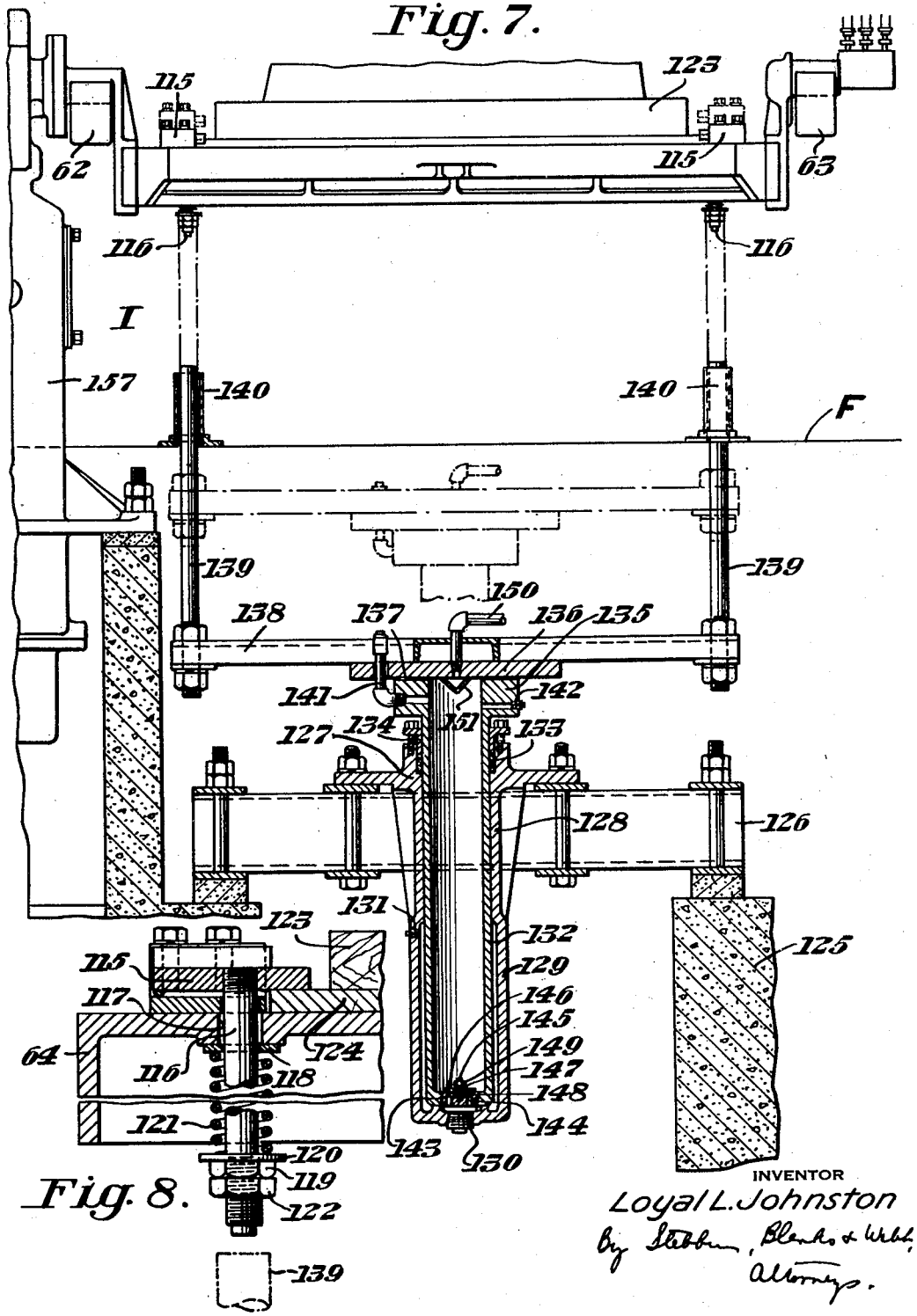

March 23, 1948.    L. L. JOHNSTON    2,438,218
MOLDING MACHINE
Filed July 6, 1944    17 Sheets-Sheet 7

INVENTOR
Loyal L. Johnston
By Stebbins, Blenko & Webb
Attorneys.

March 23, 1948.　　　L. L. JOHNSTON　　　2,438,218
MOLDING MACHINE
Filed July 6, 1944　　　17 Sheets-Sheet 8

INVENTOR
Loyal L. Johnston
By Stebbins, Blenko & Webb
Attorneys.

March 23, 1948. L. L. JOHNSTON 2,438,218
MOLDING MACHINE
Filed July 6, 1944 17 Sheets-Sheet 9

March 23, 1948. L. L. JOHNSTON 2,438,218
MOLDING MACHINE
Filed July 6, 1944 17 Sheets-Sheet 10

INVENTOR
Loyal L. Johnston
By Stebbins, Blenko & Webb,
Attorneys.

March 23, 1948.  L. L. JOHNSTON  2,438,218
MOLDING MACHINE
Filed July 6, 1944  17 Sheets-Sheet 11

INVENTOR
Loyal L. Johnston

March 23, 1948.   L. L. JOHNSTON   2,438,218
MOLDING MACHINE
Filed July 6, 1944   17 Sheets-Sheet 12

INVENTOR
Loyal L. Johnston

March 23, 1948.  L. L. JOHNSTON  2,438,218
MOLDING MACHINE
Filed July 6, 1944  17 Sheets-Sheet 13

INVENTOR
Loyal L. Johnston

March 23, 1948. L. L. JOHNSTON 2,438,218
MOLDING MACHINE
Filed July 6, 1944 17 Sheets-Sheet 14
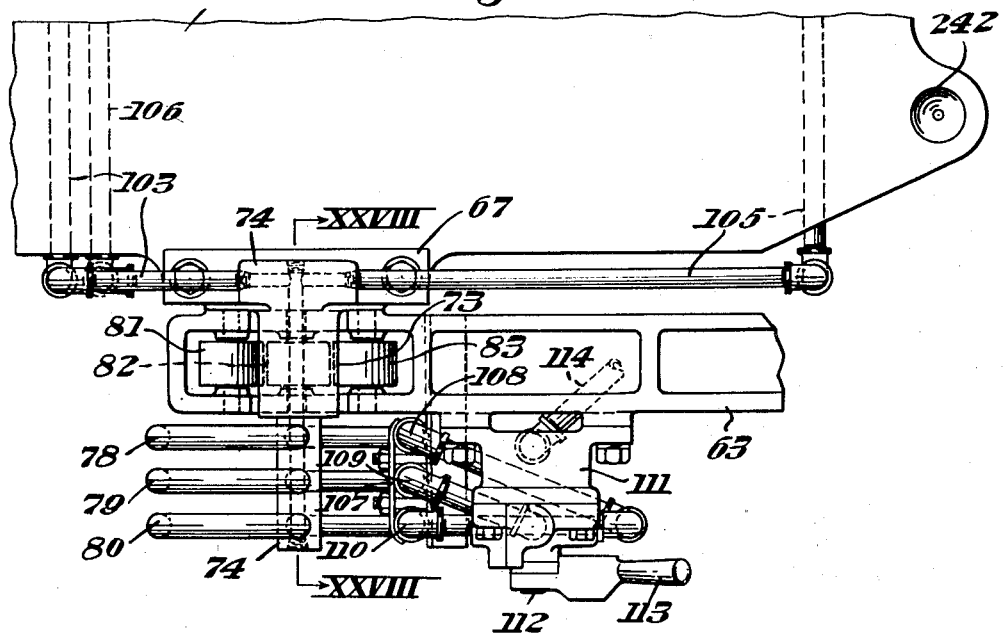
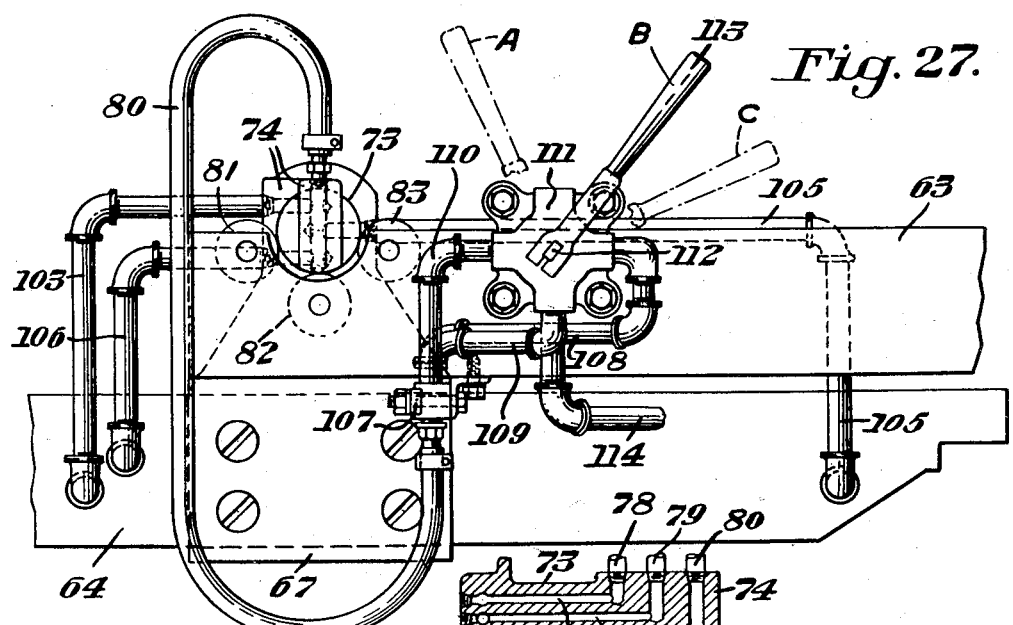
INVENTOR
Loyal L. Johnston

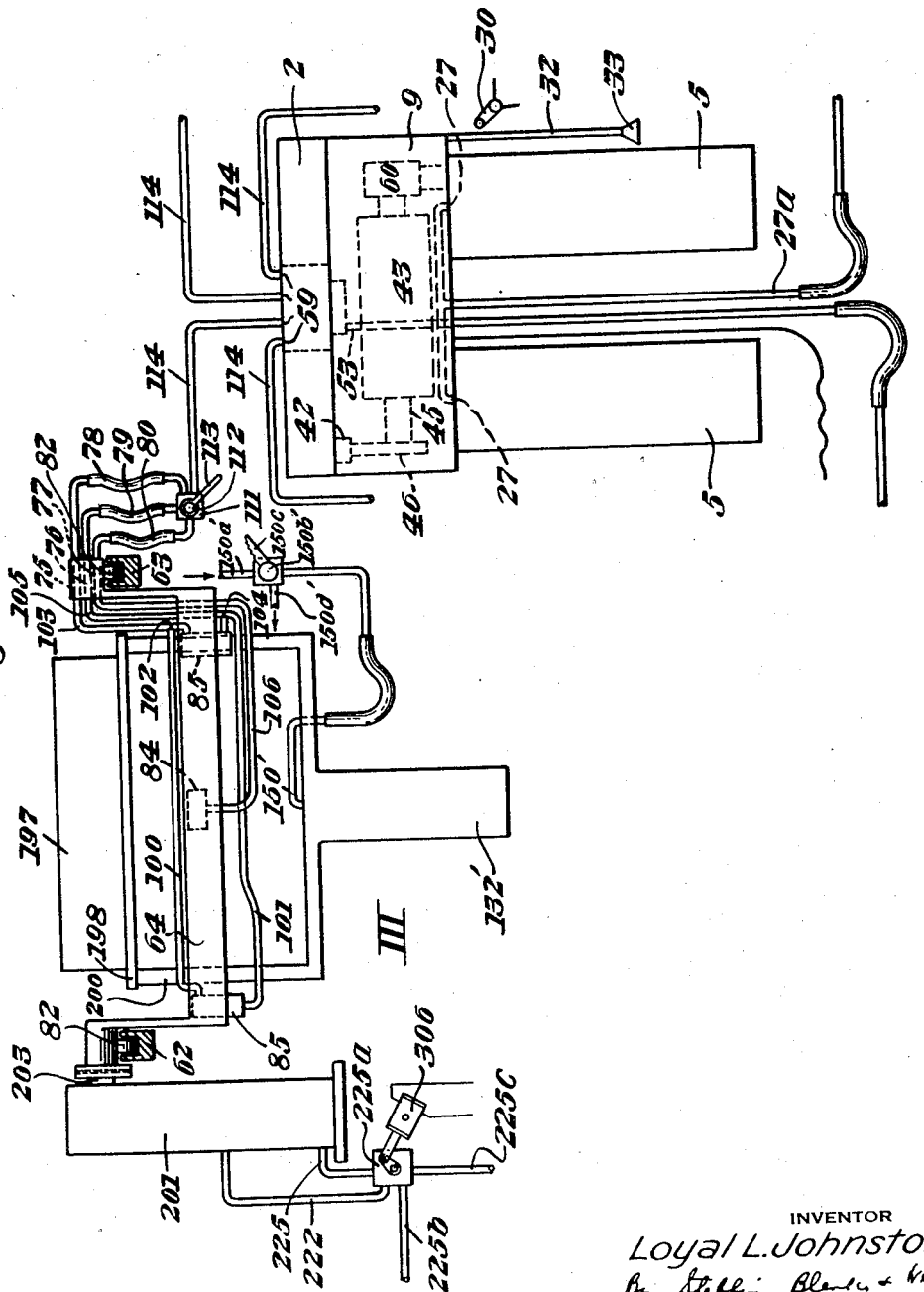

March 23, 1948.　　　L. L. JOHNSTON　　　2,438,218
MOLDING MACHINE
Filed July 6, 1944　　　17 Sheets-Sheet 16
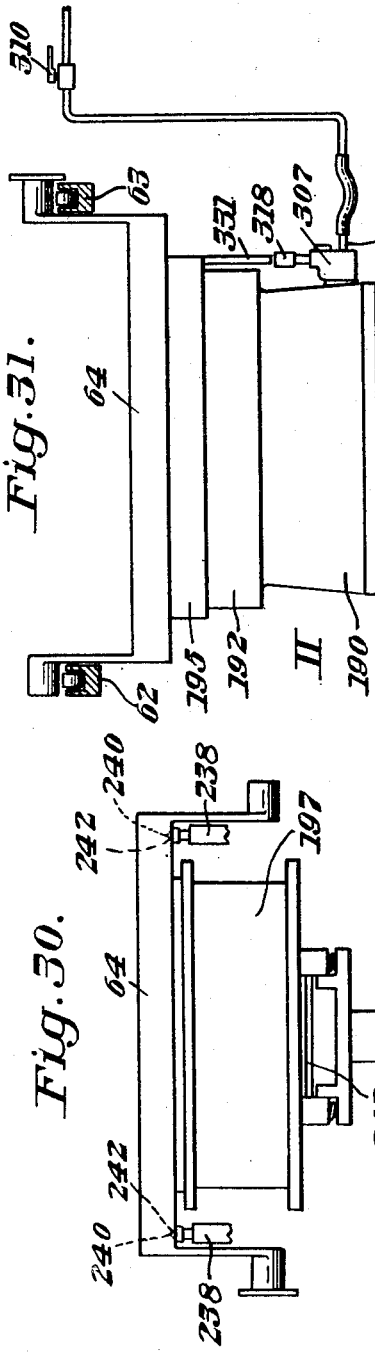
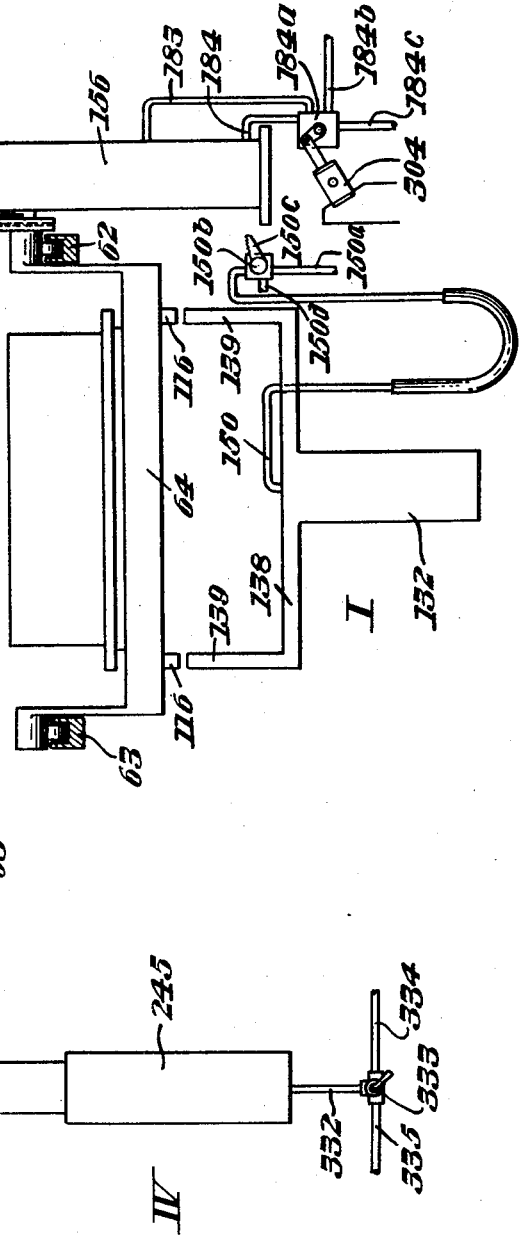
INVENTOR
Loyal L. Johnston

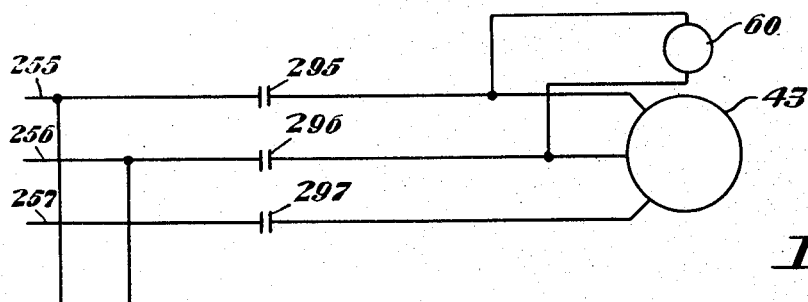
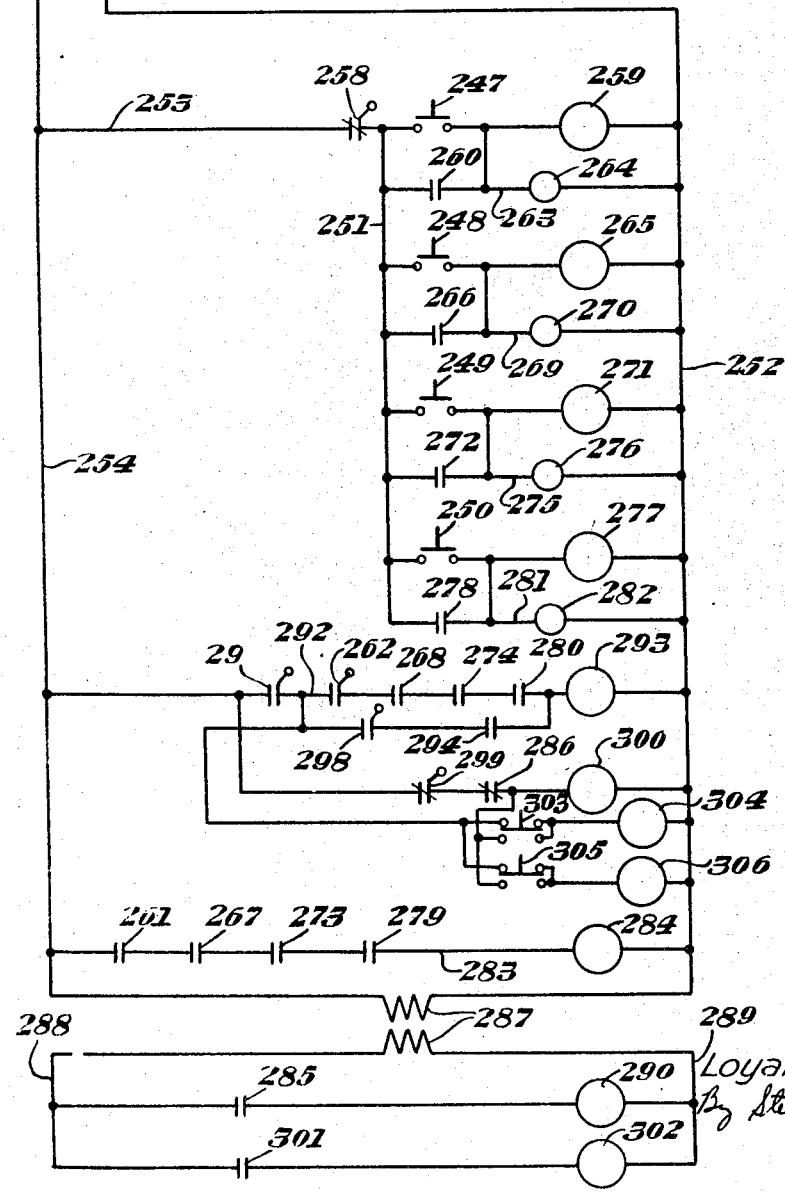
Fig. 33.
INVENTOR
Loyal L. Johnston

Patented Mar. 23, 1948

2,438,218

UNITED STATES PATENT OFFICE 2,438,218

MOLDING MACHINE

Loyal L. Johnston, Zelienople, Pa., assignor to Herman Pneumatic Machine Company, Pittsburgh, Pa., a corporation of Pennsylvania Application July 6, 1944, Serial No. 543,656

11 Claims. (Cl. 22—20)

This invention relates to molding machines, particularly machines for making foundry molds. It relates more particularly to station type machines for making molds progressively, performing successive operations at successive stations to which the mold being made or formed is successively moved.

I provide a molding machine which by reason of the arrangement and cooperative action of the parts produces molds of high quality faster and more efficiently than it has heretofore been possible to make molds of comparable quality. My molding machine is adaptable for making molds of various sizes, being of especial advantage in the making of the larger sizes of foundry molds. The machine accomplishes its work with a minimum of manual operation and supervision, and those manual operations which are required to be performed are at least largely, if not entirely, such as to require no particular skill or special ability on the part of the operator. By its use I am enabled to produce molds, and particularly large size molds, at a much higher rate per man hour than the rates at which it has heretofore been possible to produce comparable molds.

My molding machine is different in many respects from molding machines which have heretofore been used and with which I am familiar. The operations which are performed at the respective stations are so correlated that they take place simultaneously on different molds in process of manufacture but without interference with one another. Various parts of the mechanism, as will appear, are of improved construction whereby to increase the efficiency of operation of the machine as a whole.

I shall proceed to describe in detail a present preferred form of molding machine, and as the description proceeds the various features of novelty and the advantages thereof will become apparent to those skilled in the art.

In the accompanying drawings I have illustrated a present preferred embodiment of my invention, in which Figure 1 is a general plan view of a molding machine;

Figure 7 is an enlarged fragmentary detail view, partly in elevation and partly in vertical cross section, of a portion of the mechanism at the lower station viewing Figure 1;

Figure 8 is a fragmentary detail vertical cross-sectional view to enlarged scale of a portion of the mechanism shown in Figure 7;

Figure 1:
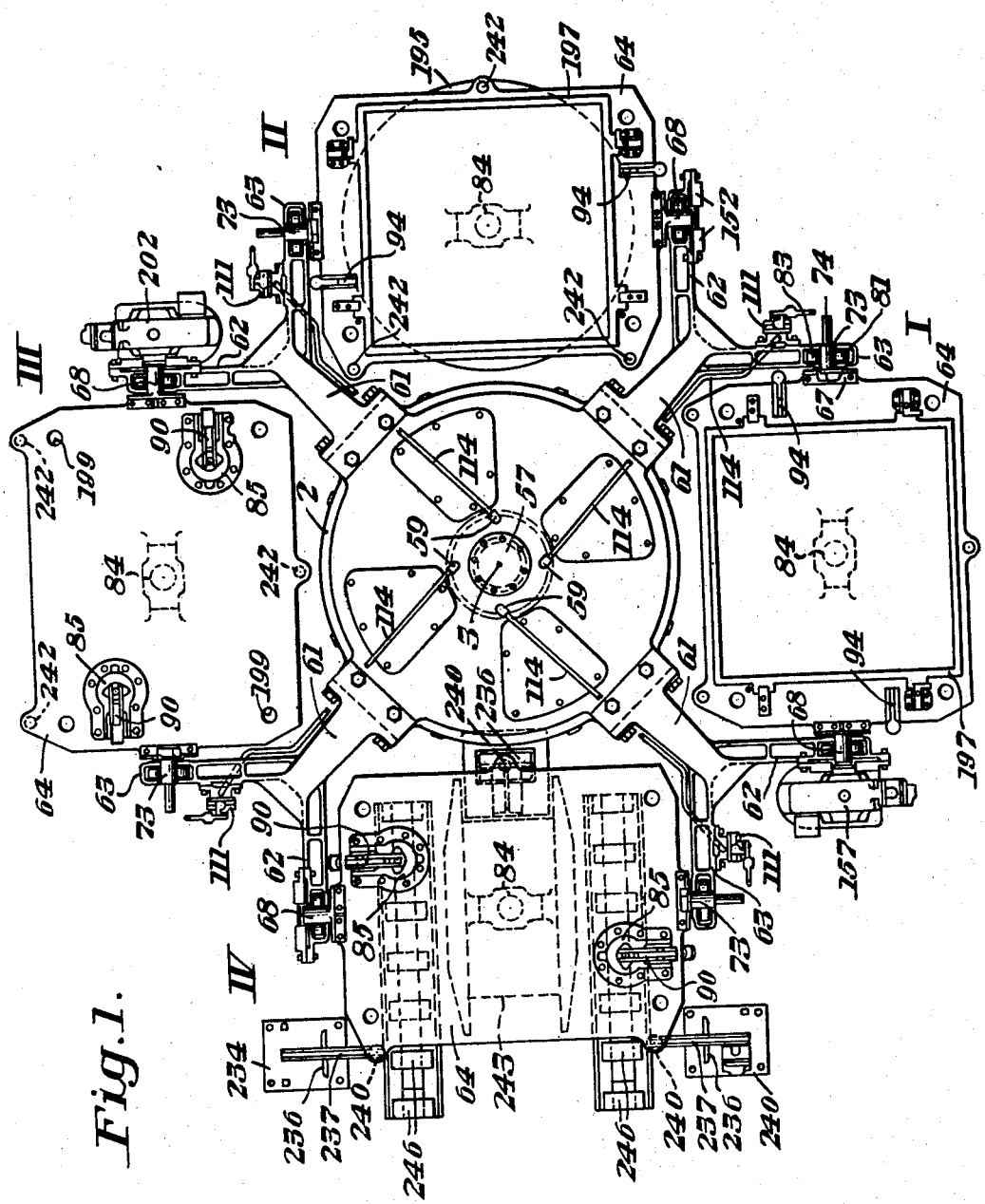
Figure 2:
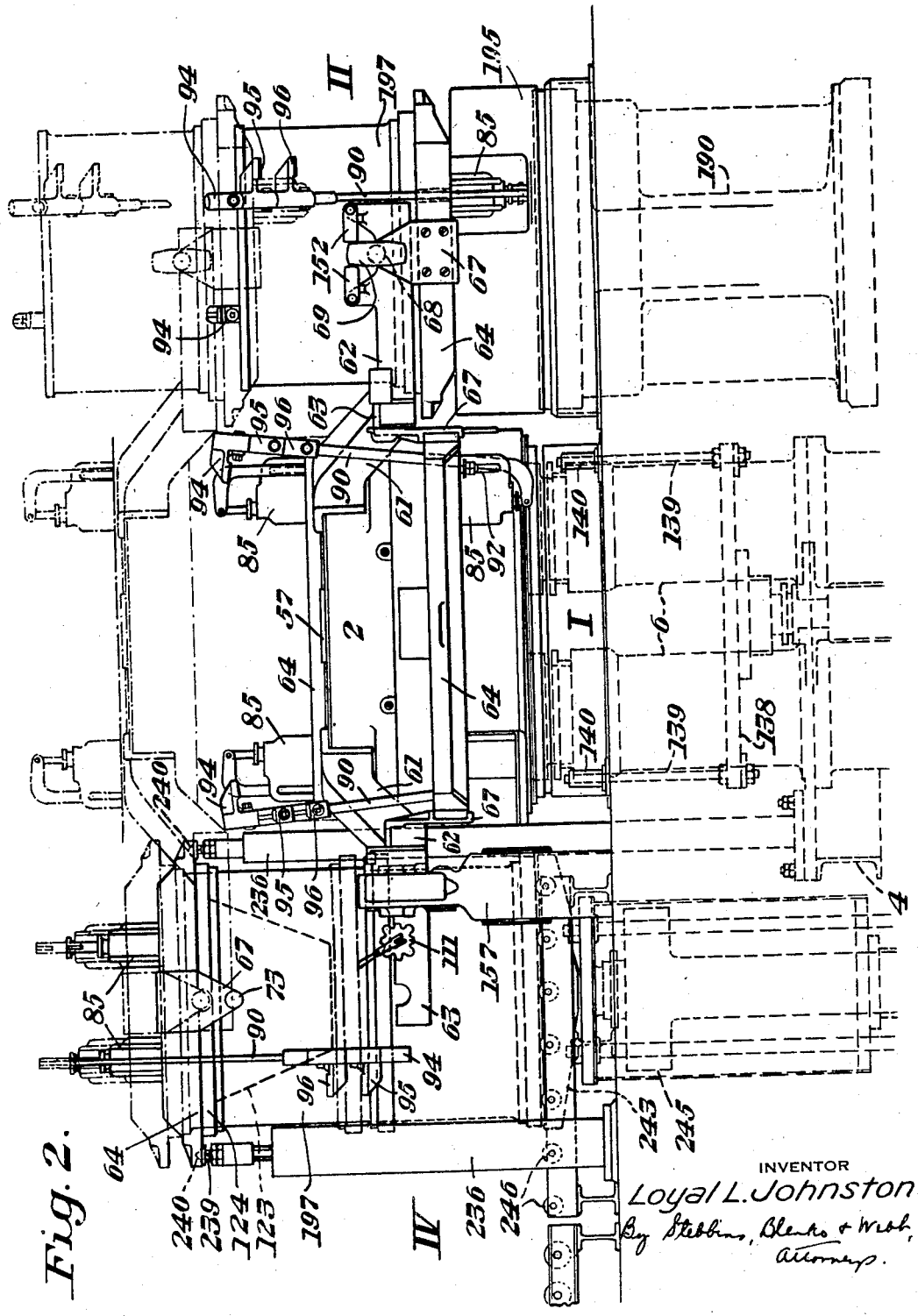
Figure 2 is an elevational view of the molding machine shown in Figure 1 as viewed from the bottom of Figure 1, Figure 2 being to somewhat larger scale than Figure 1.
Figure 3:
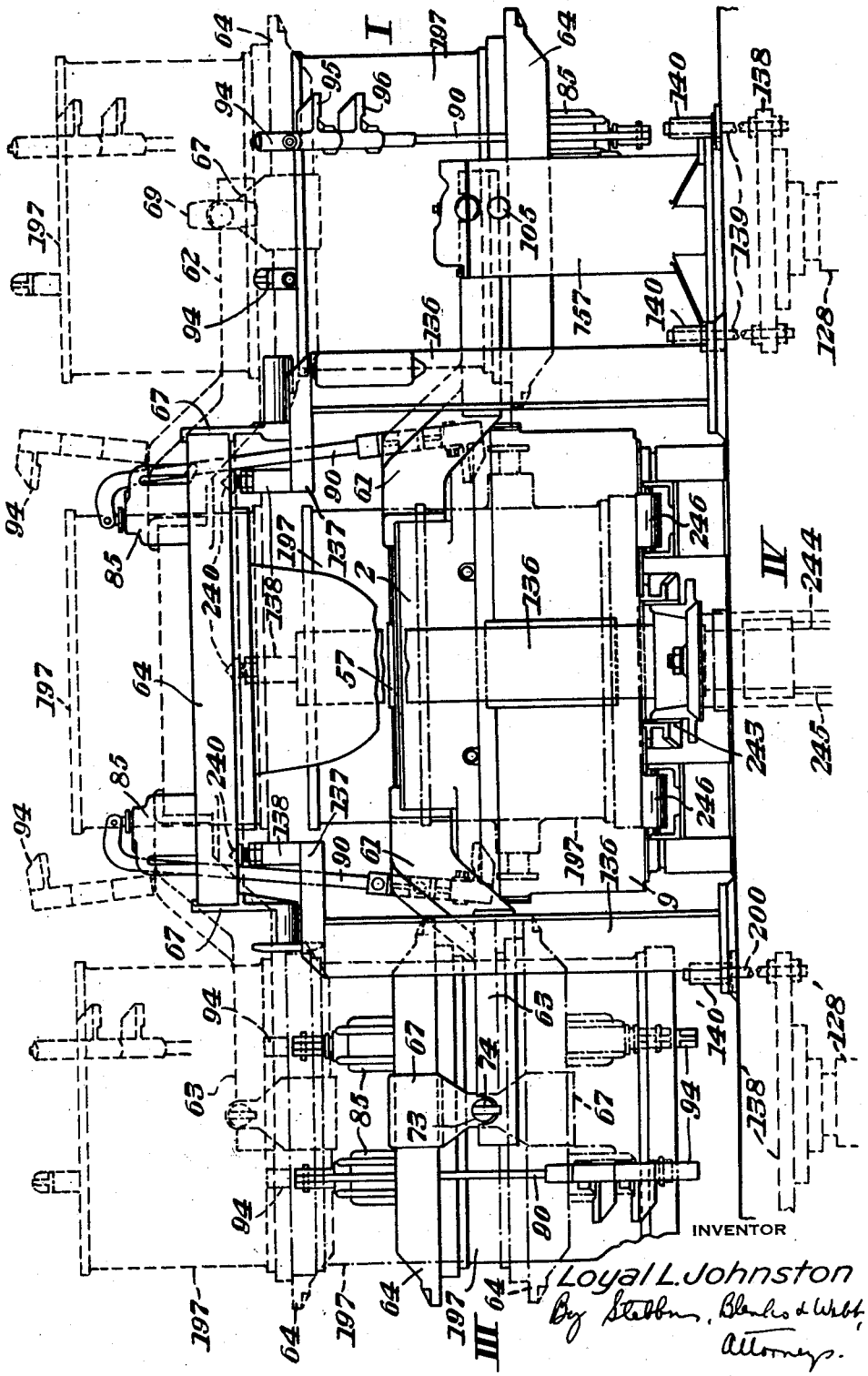
Figure 3 is an elevational view to still larger scale than Figure 2 of the molding machine shown in Figures 1 and 2 but as viewed from the left in said figures.
Figure 18:
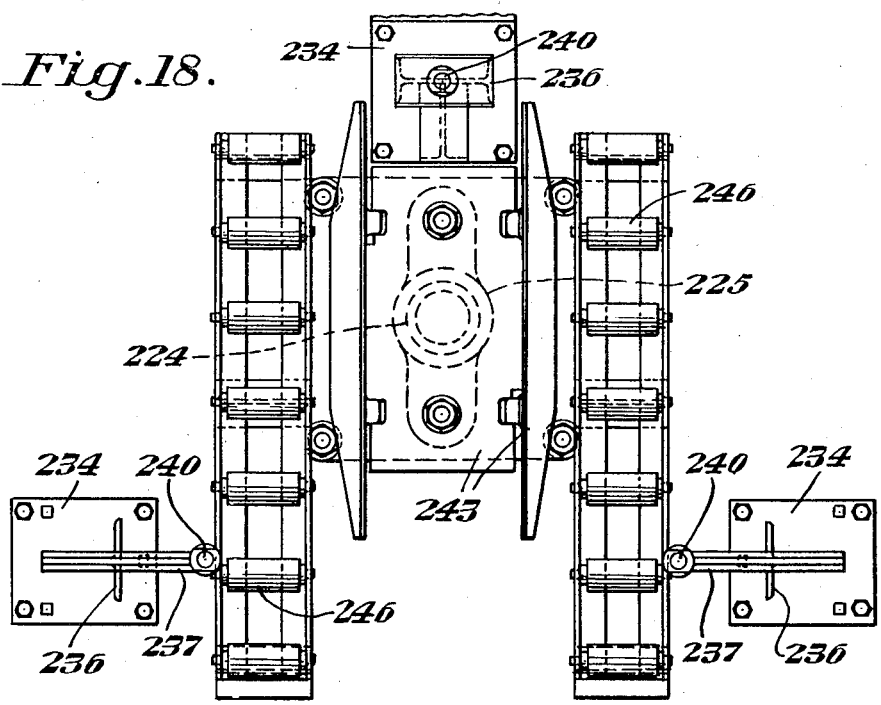
Figure 18 is a plan view of a portion of the mechanism at the left-hand station viewing Figure 1.
Figure 19:
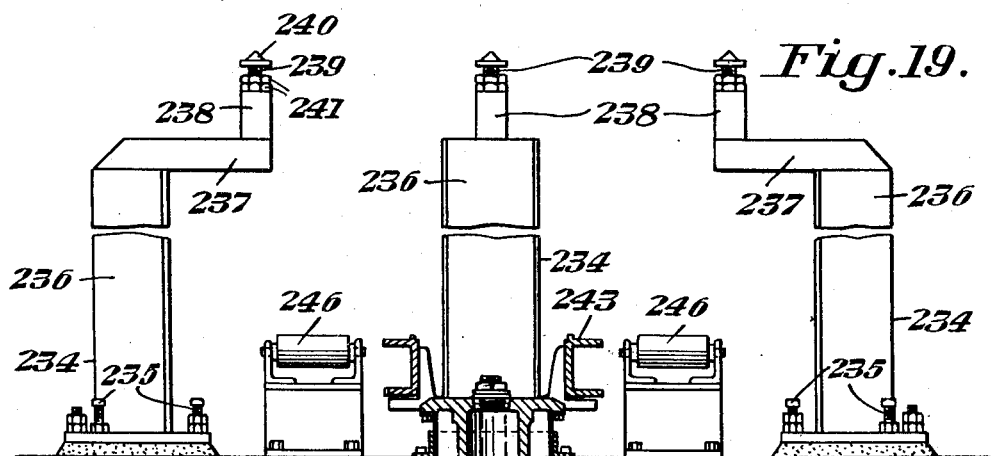
Figure 20:
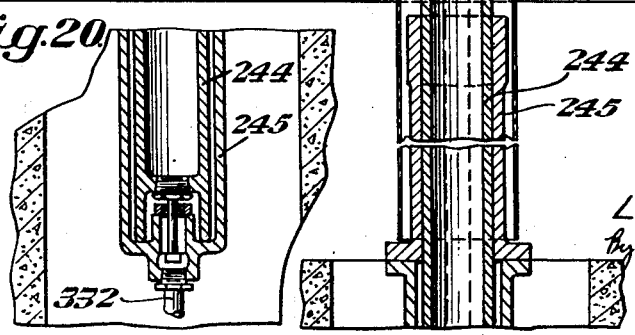
Figure 21:
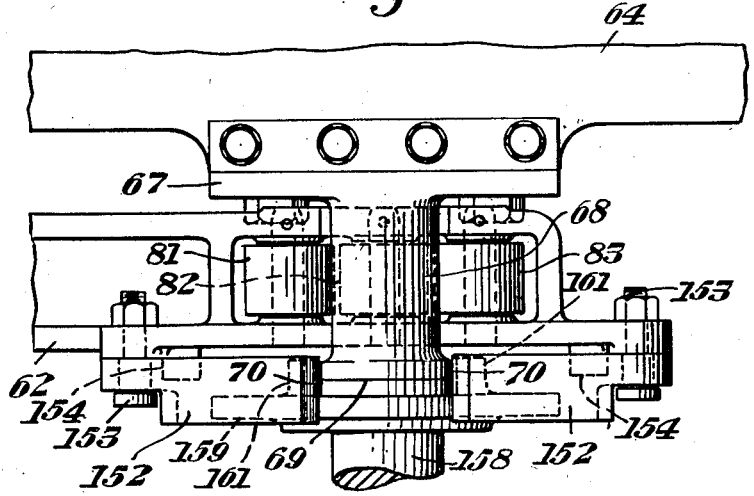
Figure 22:
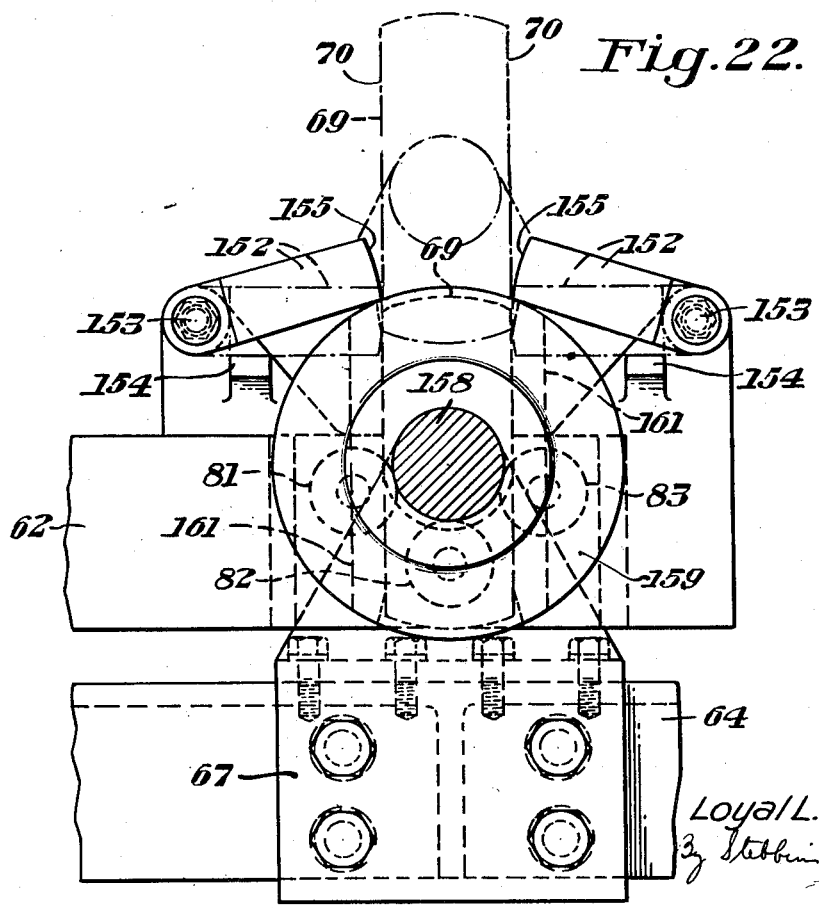
Figure 23:
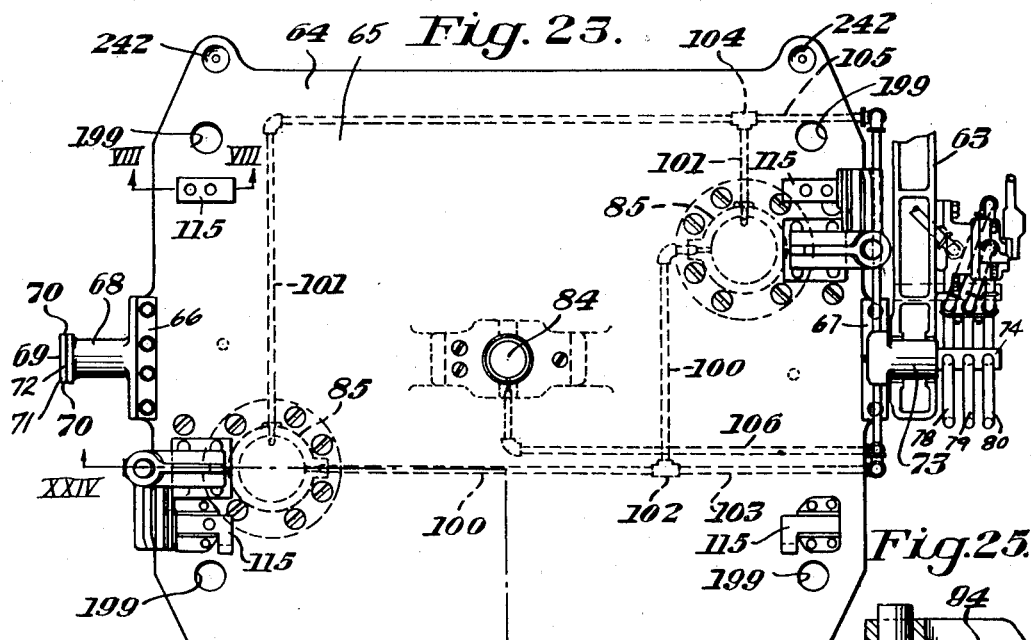
Figures 24, 25:
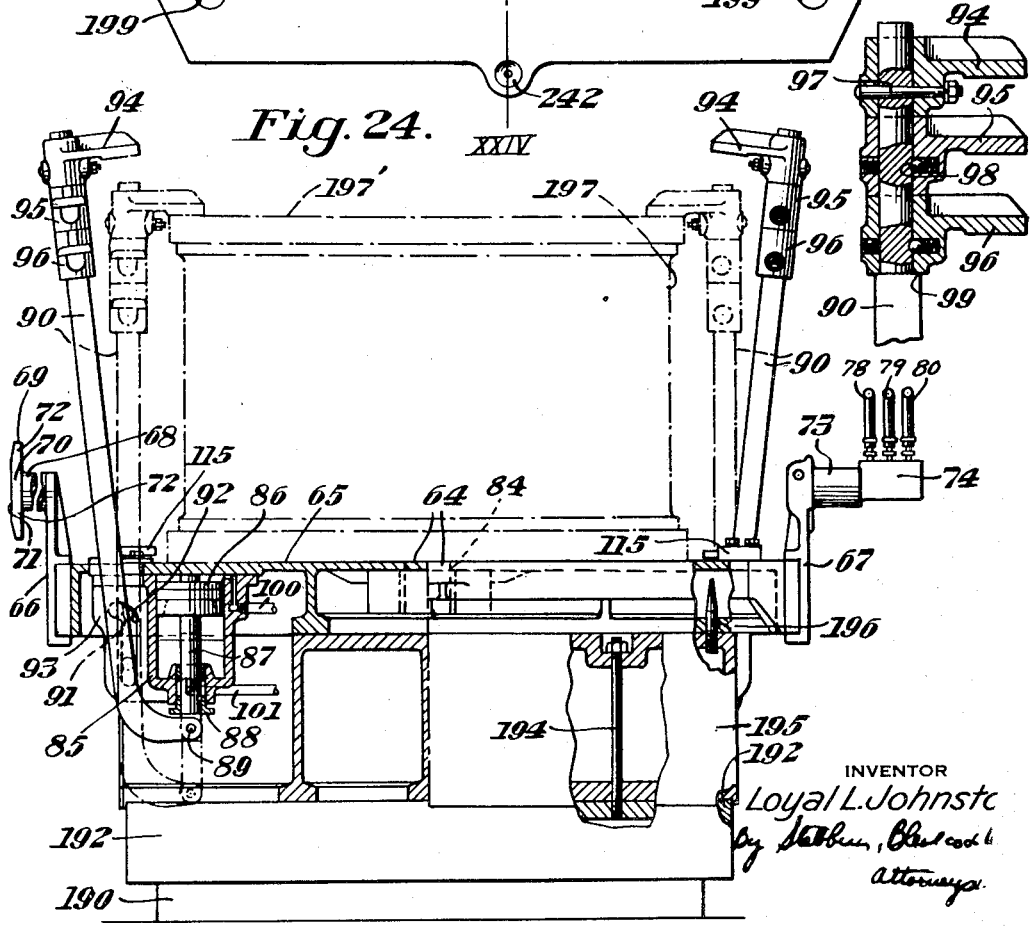

Figures 19 and 20 taken together constitute a fragmentary view partly in elevation and partly in vertical cross section of the mechanism shown in Figure 18;

Figure 21 is an enlarged fragmentary plan view of a portion of the mold support holding mechanism on the carrier for holding each of the mold supports;

Figure 22 is an elevational view of the mechanism shown in Figure 21;

Figure 23 is a plan view of one of the mold supports with a portion of the supporting mechanism therefor;

Figure 24 is an elevational view, partly in vertical cross section, of a mold support, showing it in place on a base provided at the right-hand station, viewing Figure 1;

Figure 25 is a fragmentary detail view, partly in elevation and partly in vertical cross section, illustrating a portion of the means for holding a flask on the support;

Figure 26 is an enlarged fragmentary plan view of a portion of the mechanism shown at the right-hand end of Figure 23;

Figure 27 is an elevational view of the structure shown in Figure 26;

Figure 28 is a vertical transverse cross-sectional view taken on the line XXVIII—XXVIII of Figure 26;

Figure 29 is a diagram showing the fluid pressure connections between the source of fluid pressure, the means for raising and lowering the turret, one of the mold supports and the mechanism at the upper station (station III) viewing Figure 1;

Figure 30 is a diagram showing the fluid pressure connections to the mechanism at the left-hand station (station IV) viewing Figure 1;

Figure 31 is a diagram showing the fluid pressure connections to the right-hand station (station II) viewing Figure 1;

Figure 32 is a diagram showing the fluid pressure connections to the lower station (station I) viewing Figure 1; and Figure 33 is a wiring diagram of the control mechanism.

Referring now more particularly to the drawings, there is provided a carrier or turret designated generally by reference numeral 2 which is movable both vertically and rotatively about its vertical axis 3 (Figure 1). The turret carries four mold supports each of which moves successively to four operating stations. In Figure 1 one of the operating stations is disposed at the bottom of the figure and is designated I, another station is disposed at the right and is designated II, another station is disposed at the top and is designated III and the fourth and last station is disposed at the left and is designated IV.

The turret 2 is adapted to move periodically first upwardly, then rotatively through an angle of 90° counterclockwise viewing Figure 1 and, finally, downwardly, as will be described in detail. Upon each such cycle of movements each of the four mold supports carried by the turret is advanced one station.

Figure 4:
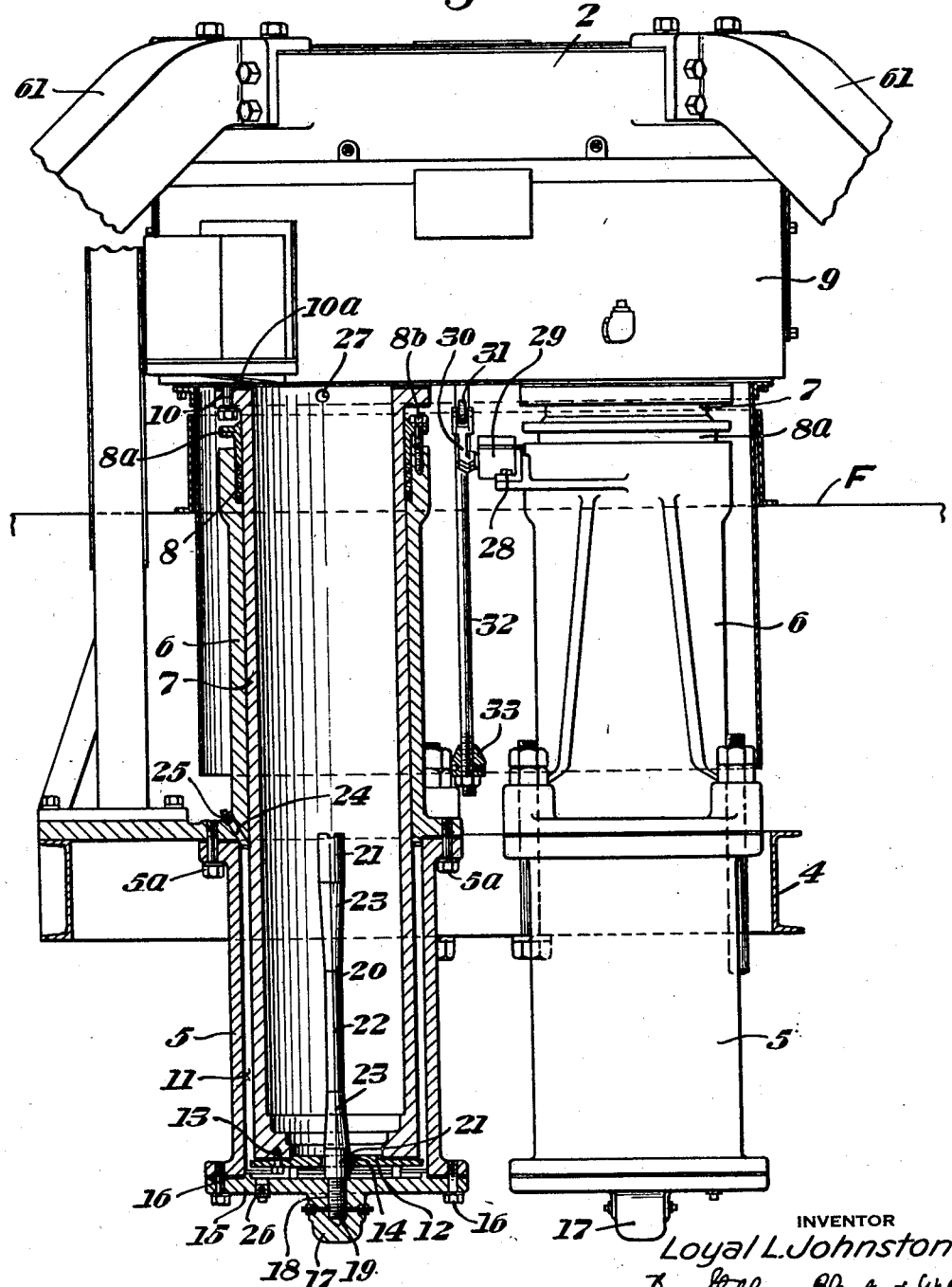
Figure 4 is an enlarged fragmentary detail view, partly in elevation and partly in vertical cross section, illustrating a portion of the mechanism for raising and lowering the carrier or turret.

Referring to Figure 4, the floor line is shown at F. Below the floor line is a foundation carrying channels 4 upon which are mounted two cylinders 5. Connected with each cylinder 5 by bolts 5a is a superposed cylinder 6, each cooperating pair of cylinders 5 and 6 forming in effect a single cylinder but having the upper portion 6 of less diameter than the lower portion 5. The two composite cylinders each consisting of the parts 5 and 6 and the mechanism cooperating therewith are duplicates of each other so that description of one will suffice for both.

Disposed within the cylinder 5—6 is a hollow piston 7 having a sliding fit within the upper cylinder portion 6. Packing 8 maintained in place by a gland 8a bolted to the cylinder 6 at 8b seals the piston 7 to the cylinder 6. Mounted upon the tops of the pistons 7 in the two cylinders 5—6 is a base 9 for the turret 2. The base 9 closes the upper ends of the hollow pistons 7 and is bolted thereto by bolts 10 so that the pistons 7 and the base 9 are in operation a unit. A gasket 10a seals each piston to the base.

An annular space 11 is provided within the cylinder 5 about the lower end of the piston therein as shown in Figure 4. The lower end of the piston 7 is covered by a plate 12 connected with the piston by bolts 13, each plate 12 having a circular central orifice 14. The cylinder 5 is closed at the bottom by a plate 15 bolted to the cylinder by bolts 16. The plate 15 has a downwardly projecting central boss 17 having an internally threaded bore 18. Threaded into the bore 18 is the lower threaded end 19 of an upstanding control member 20 which passes through the orifice 14. The control member 20 has upper and lower cylindrical portions 21 of maximum diameter, a central cylindrical portion 22 of minimum diameter and conical portions 23 joining the respective portions 21 with the portion 22. The diameter of the portions 21 of the control member 20 is only slightly less than the internal diameter of the orifice 14.

The cylinder 5 has a vent 24 closed by a plug 25. The plate 15 is provided with a drain plug 26. The hollow piston 7 is adapted to be largely filled with liquid as, for example, oil, which when the base 9 is in its lowermost position as shown in Figure 4 stands in the piston 7 only slightly below the top thereof and fills the annular space 11 between the piston and the cylinder 5. Each of the pistons 7 is provided closely adjacent the base 9 and above the maximum height to which the liquid therein can rise with an inlet 27 for gas, as, for example, air under pressure, which air is supplied through a conduit 27a (see Figure 29).

When the base 9 carrying the turret 2 is to be raised air is admitted within the two pistons 7 through the conduit 27a and inlets 27. The air forces the oil at the bottoms of the pistons through the orifices 14. The pistons slowly rise, their ascent being cushioned or controlled by the orifices 14 which provide restricted passages through which the oil from within the pistons must be delivered to permit the pistons to move upwardly.

As the base 9 and pistons 7 begin their upward movement the lower portion 21 of maximum diameter of each control member 20 lies within the orifice 14 so that the annular space within the orifice and about the portion 21 is of minimum cross section. As the piston moves upwardly the lower conical portion 23 of the control member 20 passes within the orifice 14, during which time the flow of oil downwardly through the orifice gradually increases due to the gradually increasing area of the annular space about the control member. The speed of passage of the oil downwardly through the orifice 14 and, consequently, the speed of upward movement of the base 9 is at a maximum while the central cylindrical portion 22 of the control member 20 is passing through the orifice 14. The speed of movement is gradually reduced as the upper conical portion 23 of the control member passes through the orifice and the speed of movement is very slow while the upper cylindrical portion 21 of the control member is within the orifice. Thus through control of the area of the oil outlet passage during upward movement of the pistons 7 the assembly of the base 9 and pistons 7 move first with minimum velocity, then with increasing velocity, next with maximum velocity, next with decreasing velocity and finally with minimum velocity. This results in efficient movement of the base 9 and the turret 2 thereon while avoiding jarring of the parts. Motion from rest is initiated very slowly and at the end of the movement the turret comes to rest very gently so that no damage is done to molds which have been formed or are in the process of formation.

When the turret is to be lowered the air is released from within the upper portions of the pistons 7 by opening the conduit 27a to exhaust which permits the turret and the base 9 to move downwardly under the force of gravity, the oil below the plate 12 passing upwardly through the orifice 14 about the control member 20 and the speed of movement of the turret thus being controlled on the down stroke in the same way as it is controlled when the turret moves upwardly.

Mounted on one of the cylinders 6 at 28 is a switch 29 having a pivoted arm 30 carrying a roller 31. Fastened to the bottom of the base 9 is a switch operating rod 32 which projects downwardly and carries at its lower end a switch operating cam 33 adjustably positioned thereon. As the base 9 moves upwardly and approaches its extreme upper position the cam 33 contacts the roller 31 to operate the switch 29 which closes a circuit to cause rotation of the turret as will presently be described.

By the mechanism above described the turret 2 is adapted to be raised at the conclusion of performance of operations at the respective stations and to be lowered prior to performance of the operations on the respective molds at the next succeeding stations. Each time the turret has been raised as above described it is automatically turned in the counter-clockwise direction viewing Figure 1 through an angle of 90° and after it has been thus turned it is again lowered. The mechanism for turning the turret through an angle of 90° each time it is raised will now be described.

Figure 5:
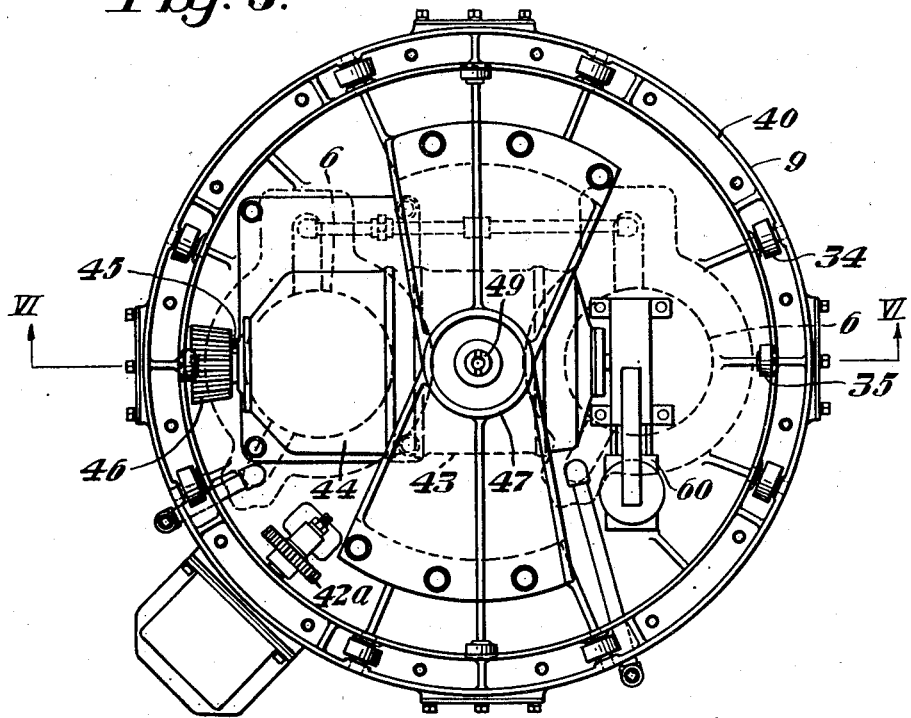
Figure 5 is a plan view of the mechanism for rotating the turret.
Figure 6:
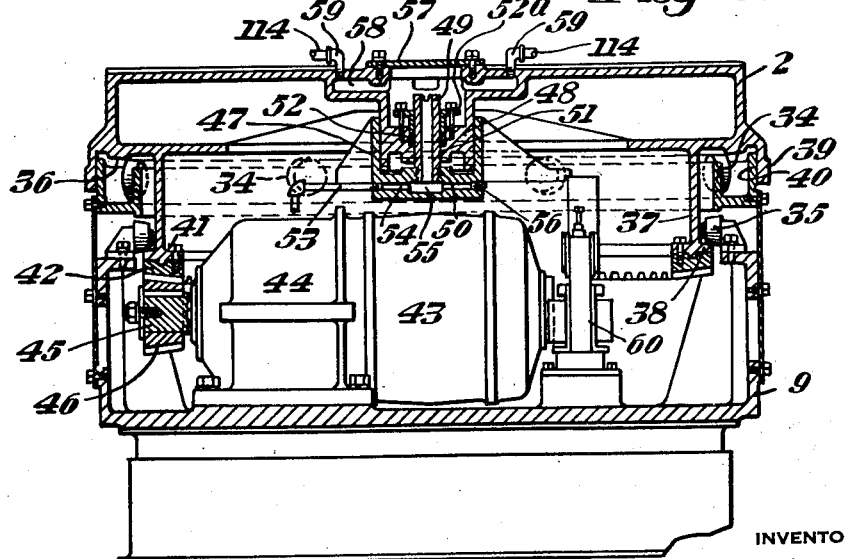
Figure 6 is a vertical cross-sectional view of the turret and the mechanism for rotating it.

Referring now to Figures 5 and 6, the base 9 has an upper circularly arranged series of rollers 34 and a lower circularly arranged series of rollers 35 adapted to support the turret 2 for rotation relatively to the base. It will be understood that the base 9 being fastened to the pistons 7 is non-rotatable, the turret rotating with respect thereto. The turret has an annular bearing portion 36 which rests on the upper rollers 34 and has an annular downward extension 37 having at its bottom an outwardly directed flange 38 which underlies the rollers 35. The turret 2 also has a skirt 39 surrounding a portion 40 of the base. Thus by the cooperating portions 39, 40 and 34, 36 and 35, 38 the turret 2 is supported and guided for rotation upon the base 9.

Bolted on the bottom of the annular extension 37 of the turret by bolts 41 is a circular downwardly facing bevel rack 42. Fastened to the base 9 is an electric motor 43 coupled to a speed reducer 44 having a radial shaft 45 to which is keyed a bevel pinion 46 meshing with the bevel rack 42. Operation of the motor 43 causes rotation of the pinion 46 and, since the motor 43 is mounted stationarily in the base 9, the turret 2 is caused to turn relatively to the base.

The base 9 carries centrally thereof an upwardly open cylinder 47 within which fits a downwardly projecting piston 48 formed integral with the turret 2. A pipe 49 is screwed into the base at 50, the pipe extending upwardly and being coaxial with the axis of rotation of the turret and also with the cylinder 47. The piston 48 has a central opening 51 receiving the pipe 49 and has packing 52 and a packing gland 52a cooperating with the pipe 49 to prevent leakage of fluid between the pipe and the piston. A fluid conduit 53 enters the base which has a bore 54 with which the conduit communicates, such bore having an enlarged central portion 55 below the pipe 49 and communicating therewith, the opposite end of the bore being closed by a plug 56.

The center of the upper surface of the turret 2 is closed by a plate 57. The turret has a confined space 58 communicating with the upper end of the pipe 49 through which fluid delivered through the pipe 49 is adapted to pass. Four fluid connections 59 communicate with the space 58 as shown in Figures 1 and 6.

The purpose of the structure just described is to deliver fluid, as, for example, air, to the turret at all times during operation of the molding machine, which fluid is rendered available on the turret for the performance of operations as will presently be described. The fluid passes through the conduit 53 and the bore 54 into the enlarged central portion 55 thereof and thence passes upwardly through the pipe 49 into the space 58 so as to be available at the fluid connections 59. When the turret rotates the piston 48 turns within the cylinder 47 but in no way interferes with the delivery of fluid to the turret through the means just described.

Applied to the shaft of the motor 43 is a magnetic brake 60. Control mechanism is provided, as will presently be described in detail, so that when the base 9 with the turret 2 thereon has been raised to its uppermost position the motor 43 will be energized to turn the turret relatively to the base through an angle of 90° about the axis 3. A limit switch cuts off the motor and applies the brake 60 at the end of the turning movement of the turret, whereupon the turret and base move downwardly. The operation of raising the turret, turning it through 90° and lowering it is performed repeatedly so long as the machine operates.

Rigidly connected with the turret 2 and forming parts thereof are four radially projecting arms 61 disposed 90° apart as shown in Figure 1. Each of the arms 61 is bifurcated, having extensions 62 and 63 arranged so that the extension 62 of one arm lies parallel to the extension 63 of an adjacent arm, each set of parallel spaced apart extensions 62 and 63 serving to carry a mold support or rollover plate 64. There being four sets of rollover plate supports 62 and 63, four rollover plates are employed in operation of the machine. These rollover plates are identical, one of them being shown in Figures 23, 24 and 25. Each rollover plate comprises a body portion 65 to which are fastened at opposite ends arms 66 and 67 which project in a direction substantially normal to the body portion 65. The arm 66 carries a trunnion 68 which terminates in a plate 69 having opposed elongated straight normally vertical edge faces 70 and having its outer face 71 beveled at the top and bottom as shown at 72. The arm 67 carries a trunnion 73 which has an extension 74 projecting generally axially of the trunnion. Fluid passages 75, 76 and 77 extend from the extension 74 through the trunnion 73 as shown in Figure 28. These passages communicate respectively with flexible fluid connections 78, 79 and 80 through which fluid under pressure is introduced to the rollover plate.

The extensions or arms 62 and 63 on the turret are provided with rollers 81, 82 and 83 (see Figures 21 and 22) arranged to provide vertically open anti-friction bearings for receiving the trunnions of the rollover plates so that a rollover plate is supported by each cooperating pair of arms 62 and 63 by reason of the fact that the trunnions of the plate lie upon the rollers thereof, but each rollover plate is readily separable from the arms carrying it upon relative movement of the arms downwardly while the rollover plate is otherwise supported as will presently appear.

Each rollover plate is provided centrally with an opening in which is positioned a vibrator 84. The vibrator is positioned with its upper surface flush with the operative face of the rollover plate so that the vibrator may operate directly against a pattern carried by the rollover plate in a manner presently to be described. Fastened to the bottom of each rollover plate, one adjacent each side edge of the plate and one on each side of the longitudinal center line of the plate, are two cylinders 85 within each of which operates a piston 86. The piston 86 carries a piston rod 87 which projects out of the bottom of the cylinder through a packing gland 88 and has pivoted thereto at 89 the end of a clamping member 90. The clamping member 90 has its lower end turned inwardly as shown in Figure 24 and has a pin 91 projecting laterally therefrom with its axis normal to the plane of the paper in Figure 24. The pin 91 enters a slot 92 in a bracket 93 carried by the rollover plate, the upper end of the slot 92 being directed outwardly as shown in Figure 24.

At its outer or upper end viewing Figure 24 each of the clamping members 90 carries three clamping jaws 94, 95 and 96. The outer clamping jaw 94 is bolted to the clamping member 90 as shown at 97 and at all times projects generally longitudinally of the rollover plate. The jaws 95 and 96, however, are rotatably mounted on the clamping member 90 so that they may be turned to inoperative positions as shown in Figure 24, this being provided for by mounting a spring pressed ball 98 in each of the jaws 95 and 96 and providing the clamping member 90 with indentations into which the balls 98 may partially project when the jaws are in operative position and when they are in inoperative position. Thus each of the jaws 95 and 96 may easily be turned by hand from operative to inoperative position and vice versa and is maintained in each of those positions by the spring pressed ball 98 which enters an appropriate indentation in the clamping member 90 for each of the positions of the jaw. The lower jaw 96 rests against a shoulder 99 on the clamping member 90 and the intermediate jaw 95 is positioned between the jaw 96 and the jaw 97 which is fastened to the clamping member 90 in the manner above explained.

The purpose of providing the three clamping jaws 94, 95 and 96 is to enable flasks of different heights to be clamped to the rollover plate. When a flask of relatively great height is to be clamped to the rollover plate the jaws 94 of the opposed clamping members 90 are employed, the jaws 95 and 96 being turned to inoperative position as shown in Figure 24. When a flask of intermediate height is to be clamped to the rollover plate the intermediate jaws 95 are moved to operative position, the lower jaws 96 remaining in inoperative position. When a relatively shallow flask is to be clamped to the rollover plate the jaws 96 are moved to operative position as shown in Figure 25.

The mounting of the clamping members 90 with the pins 91 operating in the slots 92 is such that when the pistons 86 move downwardly in the cylinders 85 the clamping members 90 are moved downwardly and at the same time swung inwardly from the positions shown in solid lines in Figure 24 to the positions shown in chain lines in that figure. When the pistons move upwardly to positions corresponding to that shown in Figure 24 the clamping members 90 move upwardly and swing outwardly to provide ample clearance for stripping or drawing the flask from the pattern and for changing flasks.

A fluid line 100 leads to each of the cylinders 85 and communicates with the interior of the cylinder above the piston 86 therein and a fluid line 101 leads to each of the cylinders 85 and communicates with the interior of the cylinder below the piston 86 therein. The two lines 100 on each rollover plate are joined at 102 to a line 103 which communicates with the fluid passage 75. The two lines 101 on each rollover plate are joined at 104 to a line 105 which communicates with the fluid passage 76. A fluid line 106 communicates with the fluid passage 77 and leads to the vibrator 84.

The lines 78, 79 and 80 are flexible hoses to provide for rolling over of the rollover plate 64 and they extend from the extension 74 to a bracket 107 where they respectively communicate with lines 108, 109 and 110. There is provided a rotary valve comprising a casing 111 with which the lines 108, 109 and 110 communicate as shown in Figure 27. Within the casing 111 is a rotary valve having a stem 112, the valve being operated by a lever 113. Also communicating with the valve casing is a fluid pressure supply line 114. The fluid employed may, for example, be compressed air. Each of the fluid pressure supply lines 114 may be connected with one of the connections 59.

When the lever 113 is in the position marked A in Figure 27 air under pressure passes from the supply line 114 to the line 108, thence through the flexible conduit 78, the fluid passage 75, the line 103 and the lines 100 to the respective cylinders 85 where the air enters above the pistons 86 to move the pistons downwardly to render the clamps effective or operative as shown in chain lines in Figure 24. At this time the lines 109 and 110 do not communicate with the supply line 114 but through the valve are open to the atmosphere. When the lever 113 is moved to the position marked B in Figure 27 the line 108 is opened to the atmosphere and the supply line 114 is brought into communication with the line 109, which in turn communicates through the flexible tube 79 and the fluid passage 76 with the line 105, which in turn communicates with the lines 101, delivering air under pressure below the pistons 86 in the cylinders 85 to move the clamps to inoperative or full line position viewing Figure 24. When the lever 113 is moved to position C in Figure 27 the line 108 is open to the atmosphere, the line 109 is in communication with the supply line 114 and the line 110 is also brought into communication with the supply line 114. The line 110 communicates with the flexible tube 80 and the fluid passage 77. The fluid passage 77 communicates with the line 106 which leads to the vibrator 84. Thus when the lever is in position C the clamps are inoperative and vibrator 84 is operated.

By the mechanism above described I provide for the turret at each operation of the machine to be raised, turned through 90° and lowered and at the same time I provide for the delivery to each of the four rollover plates carried by the turret of fluid under pressure for operating the clamps and for operating the vibrator. The fluid connections are such that the fluid is delivered to the rollover plates in either of their relatively inverted positions, and the fluid supply is maintained in all positions of the turret.

The normal position of each rollover plate upon the turret is with the body of the plate disposed below the axis of the trunnions and the clamps extending upwardly as shown in Figure 24. Each rollover plate is provided with pattern clamps 115, there being four such clamps in the embodiment shown, one adjacent each corner of the plate. Each of the clamps 115 has connected therewith a downwardly extending rod 116 (Figures 7 and 8) which passes through an opening 117 in the rollover plate 64. Surrounding the rod 116 beneath the plate 64 is a washer 118. The lower end of the rod 116 is threaded and a nut 119 is screwed thereon, a washer 120 being positioned atop the nut 119. A compression coil spring 121 is disposed between the washers 118 and 120. A lock nut 122 is provided to maintain the nut 119 in desired adjusted position. The spring 121 draws the pattern clamp 115 down toward the plate 64 to hold the pattern in place thereon. A pattern 123 is shown in Figures 7 and 8 as being held in place by clamps 115 which overlie the pattern base plate 124. The pattern base plate 124 is part of the pattern and the vibrator 84 operates directly thereagainst. The springs 121 are of sufficient strength to urge the clamps 115 down tightly against the plate 124 to insure firmly holding the pattern in place in any position of the rollover plate.

When it is desired to change patterns the rods 116 are simultaneously pressed upwardly against the action of the springs 121 to raise the clamps 115 to clear the pattern base plate 124, permitting the pattern to be drawn out parallel to the surface of the rollover plate and replaced by another pattern. The mechanism now to be described is employed for releasing the clamps 115 when it is desired to change patterns. This mechanism is provided at station I.

The foundation 125 carries channels 126 which in turn support a cylinder 127 having an upper portion 128 of relatively small internal diameter and a lower portion 129 of relatively great internal diameter. The cylinder has a drain plug 130 in its bottom and a vent plug 131 adjacent the upper end of the portion 129. The cylinder is open at its top. Disposed within the cylinder 127 is a hollow piston 132 which has a sliding fit within the portion 128 of the cylinder, packing 133 held in place by a gland 134 sealing the piston to the cylinder. At its upper end the piston 132 has a flange 135 to which is connected a plate 136, a copper gasket 137 sealing the plate to the flange. The plate 136 carries a member 138 which in turn carries at its four corners pins 139 which are disposed beneath the respective rods 116. Mounted on the floor F are four sleeves 140 arranged so that one of the pins 139 passes through each sleeve. The sleeves protect the pins against being accidentally struck by those working on the floor.

The piston 132 is provided with an oil filler 141 and an oil level plug 142 and at its bottom is provided with a speed control plug 143 having passages 144 therethrough as shown in Figure 7. Threaded into the plug 143 is a stud 145. The stud passes through a check plate 146 which lies on the plug 143, the check plate having an orifice 147 of slightly greater diameter than the external diameter of the stud. The plug 143 has in its upper surface a recess 148 which communicates with the orifice 147 and also with the passages 144. The head 149 of the stud is spaced somewhat above the upper surface of the plate 146.

A compressed gas line 150 enters the hollow piston 132 at its upper end through the plate 136. A perforate baffle 151 is disposed below the gas inlet. Preferably the gas employed is compressed air. Normally the hollow piston 132 is filled with liquid as, for example, oil, up to about the level of the oil level plug 142 and the annular space outside the piston 132 and within the portion 129 of the cylinder 127 is also filled with oil. The parts are shown in Figure 7 in solid lines in inoperative position, i. e., with the piston 132 in its lowermost position within the cylinder 127 and with the pins 139 withdrawn downwardly so as to have no contact with the rods 116.

When it is desired to change a pattern compressed air is admitted through the line 150 into the hollow piston 132 above the oil therein. A line 150a leads from the source of compressed air to a valve 150b operable by a treadle 150c. By suitable operation of the valve the line 150 may be connected either to the compressed air line 150a or to a line 150d venting to the atmosphere. Compressed air admitted through the line 150 into the hollow piston 132 above the oil therein forces the oil at the bottom of the piston through the orifice 147, the recess 148 and the passages 144 into the space outside the piston 132 and within the portion 129 of the cylinder. The piston slowly rises, its ascent being cushioned or controlled by the orifice 147 which provides a restricted passage through which the oil from within the piston must be delivered to permit the piston to move upwardly. Since the piston carries the member 138 and the pins 139 upward movement of the piston moves upwardly the pins which engage the bottoms of the rods 116, raising those rods against the action of the springs 121 and raising the clamps 115 to inoperative position to permit the pattern to be changed. When a new pattern has been inserted pressure is released from the line 150 by operating the valve 150b to connect the line 150 with the vent line 150d and the mass of the member 138, pins 139, piston 132 and associated parts results in downward movement of the piston within the cylinder 127, such movement being accompanied by the passage of oil from the space outside the piston and within the portion 129 of the cylinder through the passages 144 and the recess 148. Movement of oil upwardly through the speed control plug 143 results in lifting of the check plate 146 so that the oil can pass radially outwardly between the check plate and the plug, moving through much more rapidly than upon the upward movement of the piston when the only passage for downwardly moving oil was the relatively small orifice 147. Thus the upward movement of the piston is comparatively slow and under relatively great pressure to insure proper operation of the clamps 115 while the downward movement of the piston is more rapid and occurs by gravity, not requiring the application of fluid under pressure.

Each of the four arms 62 of the turret 2 is provided with a pair of opposed pivoted locking or latching members 152 (see Figures 21 and 22).

each of such members being pivoted to the arm 62 by a horizontal pivot 153. The latching members are so arranged that they normally assume horizontal positions extending toward each other from their respective pivots 153, resting on stops 154 on the arm 62. The outer faces 155 of the latching members 152 are slightly rounded as shown in Figure 22. In thickness the members 152 are of greater dimension than the plates 69 disposed at the extremities of the trunnions 68, as shown in Figure 21. The latching members 152 are so positioned on the arm 62 carrying them that when a rollover plate 64 is in place supported by the arm 62 and the arm 63 cooperating therewith the latching members normally lie with their opposed faces 155 closely adjacent to the vertical edge faces 70 of the plate 69 and rest on the stops 154 as shown in chain lines in Figure 22. The function of the latching members 152 is to hold the rollover plates in horizontal position except at such times as the latching members are rendered inoperative as will be described. By lying against the vertical edge faces 70 of the plates 69 the latching members in effect lock the rollover plates in horizontal position.

Figure 10:
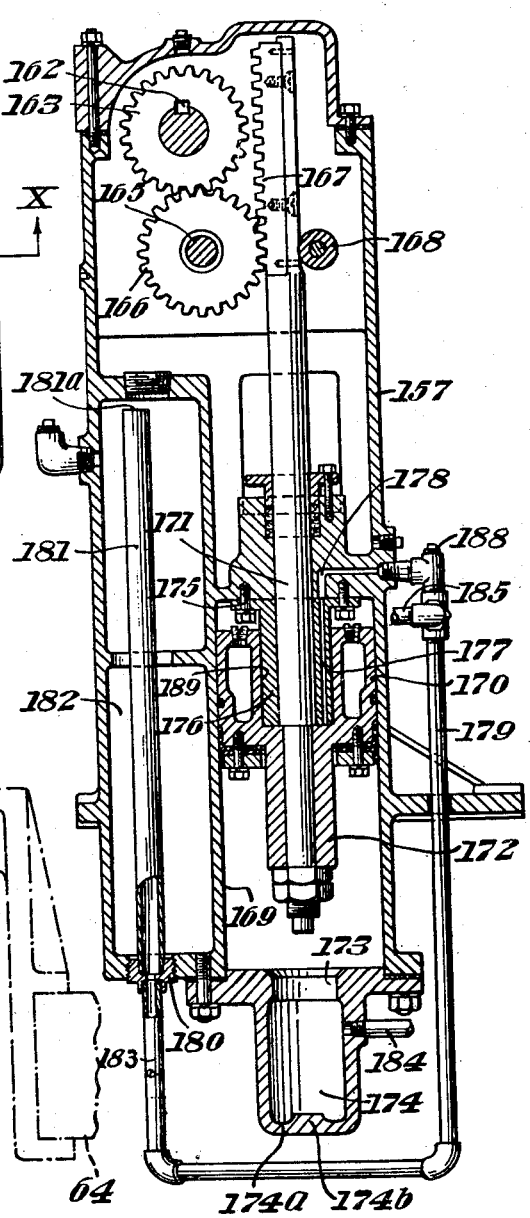
Figure 10 is a vertical cross-sectional view taken on the line X—X of Figure 9.
Figure 11:
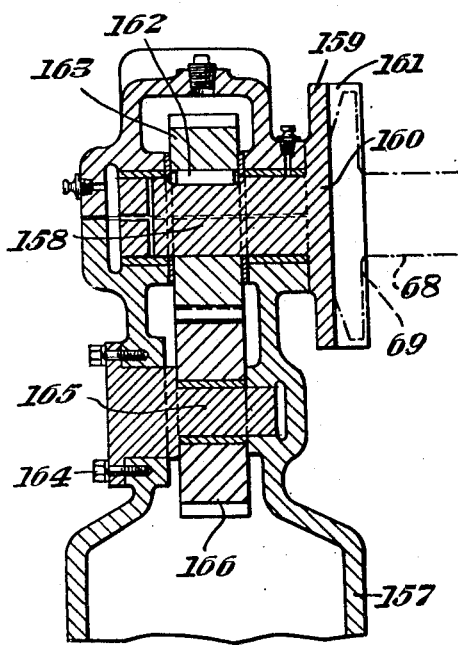
Figure 11 is a fragmentary vertical cross-sectional view taken on the line XI—XI of Figure 9.

At station I mechanism is provided for inverting rollover plates disposed at that station. As will presently appear, each rollover plate as it passes to station I is in the inverted position, i. e., the position in which the body of the plate is disposed above the trunnions and the clamping members 90 project downwardly. The rollover plate is held in that position by the latching members 152 as just explained. Mounted at station I in position to cooperate with the plate 69 of the rollover plate 64 when the turret is lowered is a pedestal 156 (see Figures 9, 10 and 11) comprising a casing 157 in which is journalled for rotation a shaft 158. Disposed outside the casing and carried on one end of the shaft 158 is a rollover plate inverting member 159 comprising a body portion 160 and opposed flanges 161 projecting from the body portion 160, the flanges 161 having their inner or opposing faces straight and parallel to each other and spaced apart a distance only slightly greater than the width of each of the plates 69 between the vertical edge faces 70 so that, as indicated in Figure 11, when the turret is lowered the plate 69 of the rollover plate 64 at station I enters or lies between the flanges 161 of the rollover plate inverting member 159. The shaft 158 is so disposed that when the turret reaches its lowermost position the axis of the shaft 158 will be coaxial with the axis of the trunnion 68. From this it will be seen that rotation of the shaft 158 through 180° will invert the rollover plate 64 since the plate 69 integral with the rollover plate 64 lies snugly between the flanges 161 of the rollover plate inverting member 159 and that member is fast to the end of shaft 158. The mechanism for turning shaft 158 through 180° to invert the rollover plate at station I will now be described.

Keyed to the shaft 158 by a key 162 is a pinion 163. Connected with the casing 157 by bolts 164 is a stub shaft 165 rotatively carrying a pinion 166 meshing with the pinion 163. The shaft 165 is parallel to the shaft 158 but is slightly offset therefrom horizontally as shown in Figure 10 to permit a rack 167 to operate vertically within the casing 157 and mesh with the pinion 166. The rack 167 is held at all times in mesh with the pinion 166 by a roller 168 bearing against the back of the rack as shown in Figure 10.

Provided in the casing 157 is a cylinder 169 in which is adapted to operate a piston 170. The piston 170 is rigidly fastened to a piston rod 171 with which the rack 167 is integral, as shown in Figure 10. The piston 170 has a reduced downward extension 172 and the cylinder 169 has in tandem therewith at its bottom a cylinder 173 through which the extension 172 is adapted to pass, as will presently be described. Below the cylinder 173 is a cylinder 174 of larger diameter and closed at its bottom, the bottom 174a of the cylinder 174 having a stop 174b against which the lower extremity of the rod 171 is adapted to come to rest to limit downward movement of the piston 170.

Bolted to the top of the cylinder 169 by bolts 175 and projecting downwardly into the cylinder 169 centrally thereof is a sleeve 176 through which the piston rod 171 passes with a snug sliding fit, the sleeve having a bore 177 parallel to its axis. Communicating with the bore 177 is a passage 178 which in turn communicates with a pipe 179 which enters a reservoir 182 at its bottom and communicates therewith. Another pipe 183 communicates through a coupling 180 in the bottom wall of the reservoir 182 with a pipe 181 extending upwardly within the reservoir but communicating therewith only at its upper end 181a. Still another pipe 184 enters the cylinder 174. Connected with the pipe 179 is a pipe 185 which enters the cylinder 169 at a point above the top of the piston 170 when the piston is in its uppermost position as shown in Figure 10. Interposed between the point at which the pipe 185 enters the cylinder and the point at which that pipe connects with the pipe 179 are a manually operable valve 186 and a check valve 187 (see Figure 9), the check valve permitting the flow of fluid through the pipe 185 only into and not out of the cylinder 169. A vent plug 188 is provided at the upper end of the pipe 179.

The reservoir 182 is a liquid reservoir, oil being the liquid which I prefer to employ. When the piston 170 is in its uppermost position as shown in Figure 10 the reservoir 182 is filled with oil to a point approaching the top 181a of the pipe 181 and the pipe 179, the passage 178 and the bore 177 are likewise filled with oil. The pipes 183 and 184 are pipes for receiving gas under pressure, as, for example, air. They both lead to a valve 184a (Figure 32) to which air under pressure is supplied through a pipe 184b, an exhaust pipe 184c also leading from the valve and opening to the atmosphere. The valve 184a may be operated to connect either of the pipes 183 and 184 with the pressure line 184b and the other simultaneously with the exhaust line 184c.

The extension 172 of the piston 170 is externally very slightly tapered from relatively small diameter at its bottom to somewhat greater diameter at its upper portion. The sleeve 176 is similarly externally tapered from relatively small diameter at its bottom to somewhat greater diameter at its upper portion. The piston 170 has an upwardly open cavity 189 in its top which receives the sleeve 176, the cavity 189, however, being of uniform diameter from top to bottom.

Figure 9:
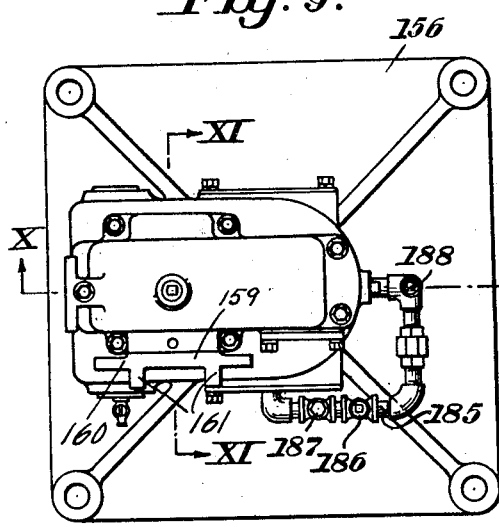
Figure 9 is a plan view of a standard provided at the lower station viewing Figure 1 having means for inverting a mold support.

Operation of the mechanism of Figures 9, 10 and 11 will be described beginning with the parts in such positions that the piston 170 is in its lowermost position with the bottom of the rod 171 and the rollover plate 64 is in its inverted position, i. e., in the position in which the body of the plate lies above the trunnions. When the piston 170 is in its lowermost position the space above the piston within the cylinder 169 is filled with oil, as are also the bore 177, the passage 178 and the pipe 179. Oil also stands to some height in the reservoir 182. When it is desired to invert the rollover plate the valve 184a is operated to connect the pipe 183 with the exhaust line 184c and to connect the pipe 184 with the pressure line 184b. Compressed air entering the cylinder 174 exerts upward pressure on the bottom of the piston 170 and moves the piston upwardly in the cylinder 169. Upward movement of the piston forces oil out of the space within the cylinder 169 above the piston 170, the oil passing through the bore 177 in the sleeve 176 and through the passage 178 and the pipe 179 to the reservoir 182. The check valve 187 prevents oil from passing through the pipe 185 from the cylinder 169 to the pipe 179. When the top of the piston 170 passes the bottom of the sleeve 176 oil above the piston and outside the sleeve is imprisoned and pressed against the top of the cylinder except that because of the taper of the sleeve 176 a limited amount of oil, which amount gradually decreases as the piston moves upwardly, may escape downwardly within the cavity 189 and outside the sleeve 176 and thence upwardly through the bore 177. As the piston approaches the top of its stroke the space through which the imprisoned oil may escape becomes progressively smaller so that at the end of its stroke the piston comes to rest very slowly and without shock. The stroke of the piston is just such as to turn the shaft 158 through 180°.

At a time when the turret is raised so that no plate 69 lies in the rollover plate inverting member 159 the piston 170 is returned to its lowermost position to make ready for inverting of the succeeding rollover plate. This is accomplished by operating the valve 184a to connect the pipe 183 with the pressure line 184b and to connect the pipe 184 with the exhaust line 184c. The compressed air entering the pipe 183 passes upwardly through and out of the pipe 181 and exerts pressure on top of the oil in the reservoir 182. At the same time air below the piston 170 in the cylinder 169 escapes through the pipe 184. Oil is forced out of the reservoir 182 through the pipe 179, the passage 178 and the bore 177 into the cylinder 169 above the piston 170 and also enters the cylinder through the pipe 185, the check valve 187 permitting flow of oil in that direction. This results in rapid downward movement of the piston 170 in the cylinder 169. The downward movement of the piston is cushioned and brought to a gradual stop by reason of the partial imprisonment of air in the cylinder 169 below the piston 170 while the extension 172 is passing within the cylinder 173. Since the extension 172 is tapered as above explained air is allowed to escape through the restricted passage provided between the extension 172 and the cylinder 173 as the extension 172 moves downwardly within the cylinder 173, but the area through which the air may escape becomes progressively less until at the end of the stroke the piston is brought to a shockless stop. The cushioning effect of air is much less than the cushioning effect of oil, so the downward movement of the piston when there is no rollover plate in engagement with the inverting member 159 is much more rapid than the upward movement of the piston when a rollover plate is being inverted. However, when the piston is moving downwardly the inverting mechanism is doing no external work and the cushioning effect of the air is sufficient.

The body portion 160 of the rollover plate inverting member 159 is of substantially circular shape and when the turret 2 moves downwardly to position a rollover plate at station I and the plate 69 thereof enters the inverting member 159 the latching members 152 will engage the body portion 160 of the inverting member 159 and will be tilted so as to be out of contact with the plate 69 as shown in full lines in Figure 22, permitting turning of the member 159 and the rollover plate without interference by the members 152. Thus the latching members 152 are automatically rendered inoperative at station I when the turret is lowered to position a rollover plate at that station whereby to permit the rollover plate to be inverted by the rollover plate inverting member 159. Conversely, when the turret rises the latching members 152 automatically reassume their operative position to lock the rollover plate in horizontal position as shown in chain lines in Figure 22, being no longer maintained in their tilted position by the body portion 160 of the member 159. The latching members 152 when in operative position hold the rollover plate in horizontal position regardless of whether it is in its normal upright or inverted position.

Station II is the jarring station at which molding material (as, for example, sand) introduced into a flask applied to a rollover plate over a pattern is jarred to form a mold within the flask and against the pattern. There is provided a fixedly mounted cylinder 190 in which the jarring piston 191 moves up and down (see Figures 12 and 13). Integral with the jarring piston is a table 192 which is adapted to be raised and then lowered against a head 193 integral with the cylinder 190. Fitting over the table 192 and fastened thereto by bolts 194 (see Figure 24) is a base 195 adapted to receive a rollover plate when in its normal position upon lowering of the turret. The base 195 is provided with positioning pins 196 having pointed upper ends as shown in Figure 24, which positioning pins are adapted to enter openings in the bottom of the rollover plate when the latter is lowered upon downward movement of the turret. The top of the base 195 is disposed so that the rollover plate comes to rest thereupon while the turret is still moving downwardly and after the rollover plate comes to rest upon the base the turret continues its downward movement so that the arms 62 and 63 move entirely out of engagement with the trunnions 68 and 73.

Thus provision is made for disposing each rollover plate at the jarring station and jarring the same while it is entirely out of contact with the turret. This is important because simultaneously with the jarring at station II the turret is supporting another mold at station III and if the mold at station II were jarred while in contact with the turret the vibrations would be transmitted through the turret to the mold at station III with likelihood of damage to that mold.

The jarring piston 191 is alternately raised by admitting fluid under pressure such as air thereunderneath and lowered by gravity when the fluid pressure beneath it is relieved. Compressed air is delivered to and from the cylinder 190 by an automatic jarring valve designated generally by reference numeral 307 and shown most clearly in Figure 13. The valve 307 comprises a casing 308 having a compressed air inlet 309. The parts are so constructed and arranged that when compressed air enters through the inlet 309 the valve operates automatically to rapidly raise and lower the jarring piston 191. A valve 310 (Figure 31)

controls the supply of compressed air to the inlet 309.

Figure 13:
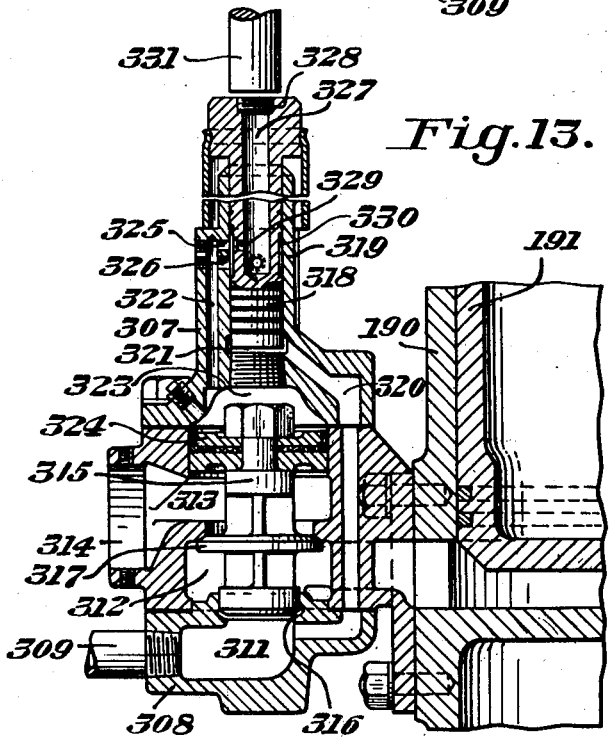
Figure 13 is an enlarged fragmentary vertical cross-sectional view through a portion of the mechanism shown in Figure 12 and illustrating particularly the jolt valve.

The valve casing 308 has a chamber 311 communicating with the inlet 309, a chamber 312 communicating with the interior of the cylinder 190 below the piston 191 and a chamber 313 communicating with an air outlet or exhaust passage 314. The valve proper is designated 315 and is adapted to move rapidly up and down within the casing, the amplitude of movement of the valve being very small. It is shown in Figure 13 in its raised or uppermost position. When the valve is up the chamber 311 is in communication with the chamber 312 through passages 316, but the chamber 312 is shut off from communication with the chamber 313 by the valve flange 317. When the valve is in its lowermost position it closes the passages 316, shutting off the chamber 311 from the chamber 312 and opening the chamber 312 to the chamber 313.

Figure 12:
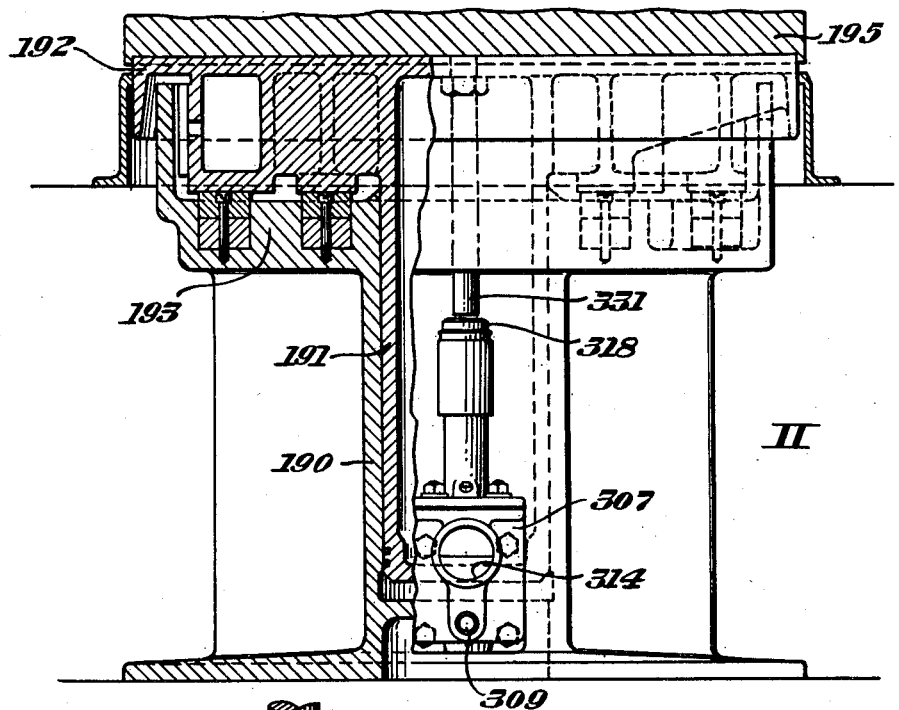
Figure 12 is a fragmentary view partly in elevation and partly in vertical cross section of a portion of the mechanism at the right-hand station viewing Figure 1.

There is provided a bunter head plunger 318 disposed for vertical oscillatory movement in a bore 321 in an upward extension 319 of the valve casing 308. A passage 320 leads from the chamber 311 to the bottom of the bore 321. In the extension 319 is a vertical passage 322 communicating at its lower end with a chamber 323 the bottom of which is defined by the valve flange 324. At its upper end the passage 322 communicates with the bore 321 through an upper port 325 and a lower port 326. The upper portion of the plunger 318 contains a bore 327 closed at its top by a plug 328. A port 329 extends through the wall of the plunger 318 to provide for communication between the bore 327 and the bore 322 in the extension 319. The plunger 318 has a portion 330 of reduced diameter extending from above the port 329 downwardly so that when the plunger 318 is in its lowermost position as shown in Figure 13 the portion 330 serves as a port communicating with the lower port 326 above mentioned. A bunter pin 331 is connected with the base 195 and projects downwardly therefrom coaxially with the plunger 318 as shown in Figures 12 and 13. When the piston 191 moves up and down the pin 331 moves in unison with it.

The operation of the jarring mechanism is as follows. When the valve 310 is opened to admit air under pressure to the chamber 311 the compressed air will raise the valve 315 to the position shown in Figure 13 and air will traverse the passages 316 into the chamber 312 and thence into the cylinder 190 below the piston 191, raising the piston and the table 192 integral therewith as well as the base 195, the rollover plate 64 positioned thereon (see Figure 24) and the pattern, flask and molding material carried by the rollover plate. A portion of the compressed air moves upwardly from the chamber 311 through the passage 320 to the bottom of the bore 321 below the plunger 318 so that as the jarring piston 191 and the bunter pin 331 rise the plunger 318 follows the bunter pin 331 upwardly. When the bottom of the plunger 318 uncovers the port 326 the air under pressure in the bore 321 below the plunger 318 passes through the port 326 and the passage 322 into the chamber 323. Due to the relatively large area of the valve flange 324 the compressed air moves the valve downwardly to its lowermost position, shutting off communication between the chambers 311 and 312 and establishing communication between the chambers 312 and 313 so that the compressed air in the cylinder 190 beneath the piston 191 passes out through the outlet 314 and the piston 191 drops. As the piston 191 moves downwardly the bunter pin 331 moves downwardly also and engages the top of the plunger 318, forcing it downwardly within the bore 321. As soon as the portion 330 of reduced diameter of the plunger 318 comes opposite the port 325 the compressed air in the chamber 323 passes out through the passage 322, the port 325, the port 329 and the bore 327 into the atmosphere through an outlet passage (not shown). Relief of the pressure on top of the valve flange 324 allows the pressure of the compressed air entering through the inlet 309 to again raise the valve 315 and the cycle is repeated. This cycle repeats itself very rapidly so long as compressed air is admitted through the inlet 309, with the result that the jarring piston 191 effectively jars the rollover plate disposed on the base 195 and the molding material disposed in the flask and against the pattern carried thereby.

After the jarring has been completed the turret moves upwardly in its next cycle and the rollover plate is picked up from the base 195 by the same arms 62 and 63 which carried it prior to its being set down. The turret rises to its upper position, is turned through 90° and is then lowered and the rollover plate with the jarred mold thereon is thus positioned at station III.

Provision is made at station III for performing either of two alternative functions. If the mold being made is a cope it may be stripped from the pattern at station III and is already in proper position for use. If, however, the mold being made is a drag it will have to be inverted before it can be used, and I find it of considerable advantage to invert the mold at station III and then strip the pattern from it at station IV, as will presently be described. Consequently I provide at station III mechanism for stripping the mold from the pattern if the mold is a cope, and also mechanism for inverting the mold, together with the rollover plate upon which it is carried, if the mold is a drag.

Figure 14:
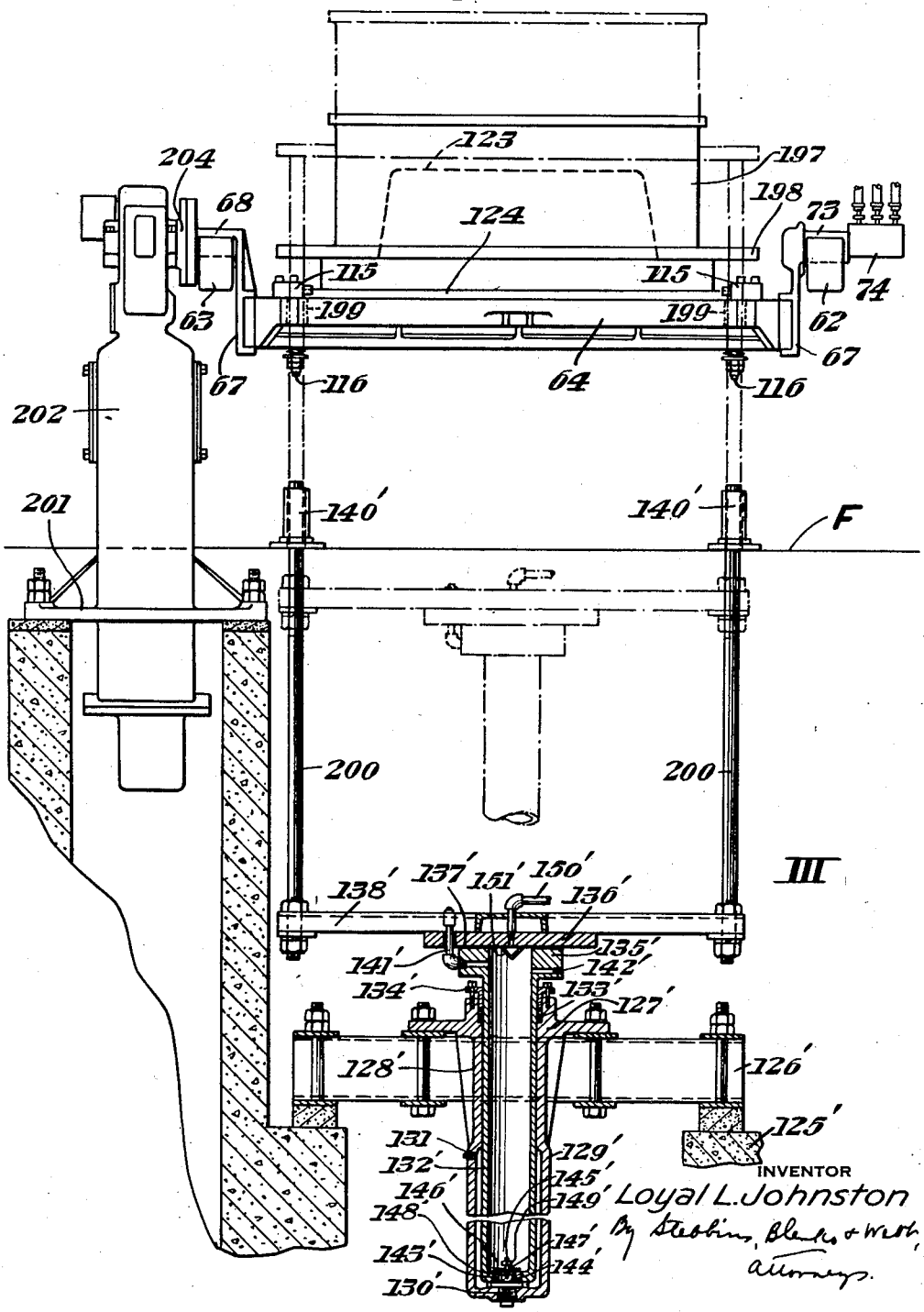
Figure 14 is enlarged fragmentary detail view, partly in elevation and partly in vertical cross section, of a portion of the mechanism at the upper station viewing Figure 1.

The means for stripping cope molds from the patterns on which they are formed is shown in Figure 14. This is accomplished by raising the flask with the mold therein from the pattern which is fastened to the rollover plate. The flask is designated generally by reference numeral 197, being provided with a horizontally projecting flange 198 at its bottom. The rollover plate is provided with four holes 199 (see Figure 23) which are disposed outside the pattern but beneath the flange 198 of the flask. Four pins 200 are provided at station III which are adapted to be raised when the rollover plate is positioned at that station so that their upper ends pass through the holes 199 and engage the under surface of the flange 198 of the flask 197. The pins 200 act in unison and raise the flask away from the rollover plate, which is maintained stationary while the pins 200 move upwardly, this resulting in stripping the mold contained within the flask from the pattern which remains fastened to the rollover plate. The flask with the mold therein may be taken from its position supported by the four pins 200 and transported to the place of use. This may be done by an overhead crane or any other suitable conveying mechanism. Not only is the mold properly positioned for use as a cope, but its elevated position facilitates its being transported to the place of use and lowered into position. Thus cope molds are completed, stripped and removed at station III, this completing their manufacture.

The means for mounting and operating the four pins 200 is to all intents and purposes identical with the means for mounting and operating the four pins 139 shown in Figure 7, and comparison of the lower portions of Figures 7 and 14 will show that they are for all practical purposes identical. This being the case, and since the construction and operation of the means for raising and lowering the pins 139 of Figure 7 has previously been fully described, there would be no advantage in again describing the same mechanism. Parts of such mechanism shown in Figures 14 and 29 corresponding to parts shown in Figures 7 and 32 are designated by the same reference numerals, each with a prime affixed.

Mounted at station III in position to cooperate with the plate 69 of the rollover plate 64 when the turret is lowered is a pedestal 201 (see Figures 15, 16 and 17) comprising a casing 202 in which is journalled for rotation a shaft 203. Disposed outside the casing and carried on one end of the shaft 203 is a rollover plate inverting member 204 which may to all intents and purposes be identical with the rollover plate inverting member 159 heretofore described. The shaft 203 is so disposed that when the turret reaches its lowermost position the axis of the shaft 203 will be coaxial with the axis of the trunnion 68. From this it will be seen that rotation of the shaft 203 through 180° will invert the rollover plate 64 since the plate 69 integral with the rollover plate 64 lies snugly between the flanges of the rollover plate inverting member 204 and that member is fast to the end of shaft 203. The mechanism for turning the shaft 203 through 180° to invert the rollover plate at station III will now be described.

Figure 16:
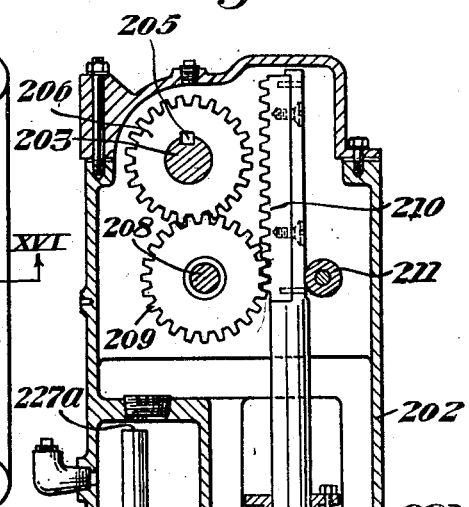
Figure 16 is a vertical cross-sectional view taken on the line XVI—XVI of Figure 15.

Keyed to the shaft 203 by a key 205 is a pinion 206. Connected with the casing 202 by bolts 207 is a stub shaft 208 rotatively carrying a pinion 209 meshing with the pinion 206. The shaft 208 is parallel to the shaft 203 but is slightly offset therefrom horizontally as shown in Figure 16 to permit a rack 210 to operate vertically within the casing 202 and mesh with the pinion 209. The rack 210 is held at all times in mesh with the pinion 209 by a roller 211 bearing against the back of the rack as shown in Figure 16.

Provided in the casing 202 is a cylinder 212 in which is adapted to operate a piston 213. The piston 213 is rigidly fastened to a piston rod 214 with which the rack 210 is integral, as shown in Figure 16. The piston 213 has a reduced downward extension 215 and the cylinder 212 has in tandem therewith at its bottom a cylinder 216 through which the extension 215 is adapted to pass, as will presently be described. Below the cylinder 216 is a cylinder 217 of larger diameter and closed at its bottom, the bottom 217a of the cylinder 217 having a stop 217b against which the lower extremity of the rod 214 is adapted to come to rest to limit downward movement of the piston 213.

Bolted to the top of the cylinder 212 by bolts 218 and projecting downwardly into the cylinder 212 centrally thereof is a sleeve 219 through which the piston rod 214 passes with a snug sliding fit, the sleeve having a bore 220 parallel to its axis. Communicating with the bore 220 is a passage 221 which in turn communicates with a pipe 222 which may be connected with a source of compressed gas, as air, or opened to exhaust. A pipe 223 enters the bottom of the cylinder 212 and also enters a reservoir 224 at the bottom thereof and communicates therewith. Another pipe 225 communicates through a coupling 226 in the bottom wall of the reservoir 224 with a pipe 227 extending upwardly within the reservoir but communicating therewith only at its upper end 227a. A passage 228 leads from the cylinder 216 to the bottom of the reservoir 224. Connected with the pipe 222 is a pipe 229 which enters the cylinder 212 at a point above the top of the piston 213 when the piston is in its uppermost position as shown in Figure 16. In the pipe 223 are a manually operable valve 230 and a check valve 231 (see Figure 16), the check valve permitting the flow of fluid through the pipe 223 only into and not out of the cylinder 212. A plug 232 is provided in the wall of the cylinder 212 adjacent its bottom.

The reservoir 224 is a liquid reservoir, oil being the liquid which I prefer to employ. When the piston 213 is in its lowermost position as shown in Figure 16 the reservoir 224 is filled with oil to a point approaching the top 227a of the pipe 227 and the pipe 223 and the passage 228 are likewise filled with oil. The pipes 222 and 225 are pipes for receiving gas under pressure, as, for example, air. They both lead to a valve 225a (Figure 29) to which air under pressure is supplied through a pipe 225b, an exhaust pipe 225c also leading from the valve and opening to the atmosphere. The valve 225a may be operated to connect either of the pipes 222 and 225 with the pressure line 225b and the other simultaneously with the exhaust line 225c.

The extension 215 of the piston 213 is externally very slightly tapered from relatively small diameter at its bottom to somewhat greater diameter at its upper portion. The sleeve 219 is similarly externally tapered from relatively small diameter at its bottom to somewhat greater diameter at its upper portion. The piston 213 has an upwardly open cavity 233 in its top which receives the sleeve 219, the cavity 233, however, being of uniform diameter from top to bottom.

Figure 15:
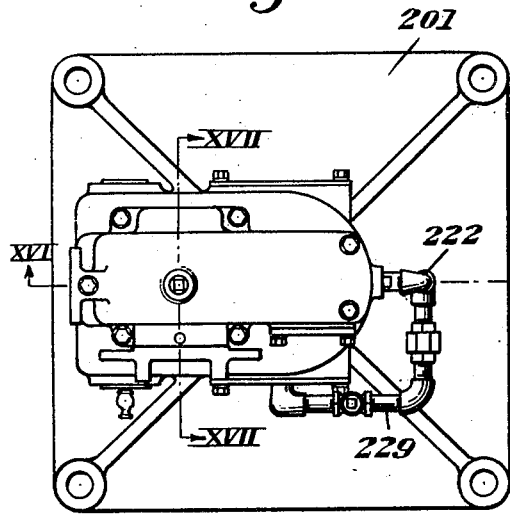
Figure 15 is a plan view of a standard provided at the upper station viewing Figure 1 having means for inverting a mold support.
Figure 17:
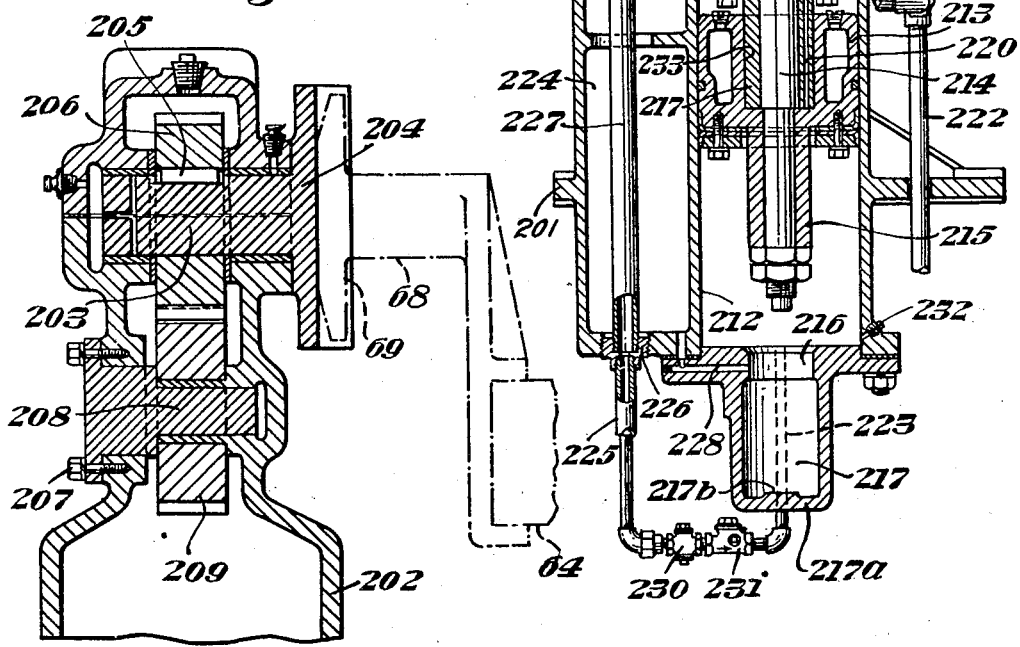
Figure 17 is a fragmentary vertical cross-sectional view taken on the line XVII—XVII of Figure 15.

Operation of the mechanism of Figures 15, 16 and 17 will be described beginning with the parts in such position that the piston 213 is at the top of the cylinder 212 and the rollover plate 64 is in its normal position, i. e., in the position in which the body of the plate lies below the trunnions. When the piston 213 is at the top of the cylinder 212 the space below the piston within the cylinder 212 is filled with oil as are also the cylinders 216 and 217, the pipe 223 and the passage 228. Oil also stands to some height in the reservoir 224. When it is desired to invert the rollover plate the valve 225a is operated to connect the pipe 225 with the exhaust line 225c and to connect the pipe 222 with the pressure line 225b. Compressed air entering the cylinder 212 exerts downward pressure on the top of the piston 213 and moves the piston downwardly in the cylinder 212. Downward movement of the piston forces oil out of the space within the cylinder 212 below the piston 213, the oil passing through the passage 228 to the reservoir 224. The check valve 231 prevents oil from passing through the pipe 223 from the cylinder 212 to the reservoir 224. When the bottom of the extension 215 passes the top of the cylinder 216 oil below the piston is imprisoned and pressed against the bottom of the cylinder 217 except that because of the taper of the extension 215 a limited amount of oil, which amount gradually decreases as the piston moves downwardly, may escape through the passage 228. As the piston approaches the bottom of its stroke the space through which the imprisoned oil may escape becomes progressively smaller so that at the end of its stroke the piston comes to rest very slowly and without shock. The stroke of the piston is just such as to turn the shaft 203 through 180°.

At a time when the turret is raised so that no plate 69 lies in the rollover plate inverting member 204 the piston 213 is returned to its uppermost position to make ready for inverting of the succeeding rollover plate. This is accomplished by operating the valve 225a to connect the pipe 225 with the pressure line 225b and to connect the pipe 222 with the exhaust line 225c. The compressed air entering the pipe 225 passes upwardly through and out of the pipe 227 and exerts pressure on the top of the oil in the reservoir 224. At the same time air above the piston 213 in the cylinder 212 escapes through the pipe 222. Oil is forced out of the reservoir 224 through the passage 228 into the cylinder 216 below the piston 213 and also enters the cylinder 212 through the pipe 223, the check valve 231 permitting flow of oil in that direction. This results in rapid upward movement of the piston 213 in the cylinder 212. The upward movement of the piston is cushioned and brought to a gradual stop by reason of the partial imprisonment of air in the cylinder 212 above the piston 213 while the sleeve 219 is passing within the cavity 233. Since the sleeve 219 is tapered as above explained air is allowed to escape through the restricted passage provided between the sleeve 219 and the cavity 233 as the cavity 233 moves upwardly over the sleeve 219, but the area through which the air can escape becomes progressively less until at the end of the stroke the piston is brought to a shockless stop. As in the case of the mechanism shown in Figures 9, 10 and 11, the cushioning effect produced by the oil when the loaded rollover plate inverting member 204 is being operated is much greater than the cushioning effect produced by the air when the rollover plate inverting member is being turned over without having any rollover plate connected therewith.

The rollover plate inverting member 204 at station III is provided with a portion for rendering inoperative the latching members 152 just as is the case at station I. When a drag mold is being made the rollover plate will be inverted at station III so that at the succeeding station the pattern may be stripped from the mold and the mold will lie in position ready for use. However, before the rollover plate is inverted at station III the clamping members 90 are rendered operative or moved to the chain line positions shown in Figure 24 to hold the flask in place. Before this is done the sand or other molding material is struck off and, depending upon the type of flask being used, a board may be placed on top of the flask. In any event, the clamping members are moved to operative position so that when the rollover plate is inverted the flask will be carried thereby but will lie beneath rather than on top of the rollover plate.

When a drag mold is being made and the rollover plate with the flask clamped thereto as above described has been inverted at station III the turret is elevated and turned through an angle of 90° to bring the inverted rollover plate to station IV where the pattern is stripped from the mold.

At station IV there are provided three standards 234 each mounted on the foundation and provided with levelling screws 235. Each of the standards comprises an upright portion 236, an inwardly extending portion 237 at the top of the upright portion and an upward projection 238 at the inner end of the portion 237. Each of the projections 238 threadedly receives a bolt 239 having a conical upwardly facing extremity 240, the bolt 239 being vertically adjustable and being adapted to be held in desired adjusted position by nuts 241. The parts are adjusted so that the conical extremities 240 of the bolts 239 are all positioned in the same horizontal plane. Likewise the bolts 239 are arranged in exactly the same pattern and with the same spacing as three sockets 242 in the rollover plate 64 (see Figure 23). The sockets 242 are in the surface of the rollover plate which is normally disposed upwardly but which after the plate has been inverted at station III is disposed downwardly. The function of the standards 234 is to support the inverted rollover plate in accurate horizontal position during drawing of the mold from the pattern at station IV, the pattern drawing operation being performed along a vertical axis, as will presently appear.

When the turret has been raised and turned through an angle of 90° about its vertical axis 3 and is lowered to dispose the rollover plates carried thereby at the respective stations, the rollover plate moving from station III to station IV and which is in inverted position is lowered onto the standards 234 and the conical extremities 240 of the bolts 239 enter the sockets 242 in the rollover plate and hold the plate independently of the turret, also insuring its being positioned accurately in a horizontal plane for the pattern drawing operation. The turret continues its downward movement after the rollover plate has come to rest on the standards 234 so the turret is entirely out of communication with the rollover plate during the pattern drawing operation, which is performed by mechanism separate from the turret. Thus any stresses to which the turret may be subjected during the pattern drawing operation by reason of the simultaneous performance of operations at other stations are not transmitted to the rollover plate positioned on the standards 234 at station IV or the pattern, mold and flask carried thereby.

The inverted rollover plate supported on the standards 234 has the pattern 123 clamped to it by the pattern clamps 115 and also has the flask 197 clamped to it by the clamps 90. The flask and mold are adapted to be drawn downwardly from the pattern by a head 243 mounted atop a piston 244 operating within a cylinder 245 mounted on the foundation.

Entering the bottom of the cylinder 245 is a fluid pipe 332 through which fluid under pressure, as, for example, compressed air, is adapted to be admitted for raising the piston 244 in the cylinder 245. The pipe 332 leads to a valve 333 connected with a line 334 leading to a compressor and also an exhaust line 335. The valve may be turned to connect either the pressure line 334 or the exhaust line 335 with the pipe 332. When fluid under pressure is admitted to the pipe 332 the piston 244 is raised in the cylinder 245 and when the pipe 332 is opened to exhaust through the pipe 335 the pressure within the cylinder 245 is relieved and the piston 244 moves downwardly.

After the inverted rollover plate has been positioned upon the standards 234 the piston 244 is moved upwardly until the head 243 underlies and engages the flask 197 or the board 197' if such a board is used. Care is taken to insure that the head 243 properly supports the flask so that when the head moves downwardly the flask and mold will be properly drawn from the pattern in a direction normal to the surface of the rollover plate to which the pattern is attached. Ordinarily an air locked equalizer is employed in connection with the head 243, such equalizer being well known in the art for this purpose. When the head 243 has been raised and is in supporting relationship to the flask the clamps 90 are rendered inoperative by moving them from the chain line positions to the solid line positions in Figure 24, although it will be understood that at the time the clamps are rendered inoperative they are inverted with respect to the positions in which they are shown in Figure 24. After the clamps have been rendered inoperative the vibrator 84 of the rollover plate supported on the standards 234 is operated and during operation of the vibrator the piston 244 is moved downwardly to separate the mold from the pattern. As soon as the mold has parted contact with the pattern the vibrator is stopped and the downward movement of the flask containing the mold continues.

The mechanism for drawing the mold from the pattern is well known in the art and for that reason has been shown only more or less diagrammatically and described only in general terms. I may, and in fact prefer to, employ known mechanism for drawing the mold from the pattern very slowly at the beginning of the downward movement of the piston 244 and while the vibrator 84 is being operated. After the mold has completely parted from the pattern and the vibrator has been stopped the mold is lowered at a faster speed. So far as the pattern drawing operation per se is concerned, I prefer to follow conventional practice and claim nothing new.

A table conveyor comprising opposed series of parallel generally horizontally arranged rollers 246 is disposed so that when the head 243 carrying the flask and mold approaches the bottom of the stroke of the piston 244 the flask will be deposited upon the rollers 246, facilitating its removal to the point of use. Since the mold is a drag mold it is in proper position for use and a cope mold which is removed at station III as above described may be positioned upon it.

Ordinarily an operator will be positioned at each of the four stations. The operator at station I inverts the upside down rollover plate moving from station IV to station I, changes the pattern if a pattern change is scheduled and also positions a new flask on the rollover plate and about the pattern which is to be employed. The flask clamps may, if desired, be applied or rendered operative at station I, this ordinarily being done when the flask is provided with means for retaining the molding material when the flask is inverted without the necessity of applying a separate board. If the flask employed is of the type requiring a separate board for retaining the molding material therein when the flask is inverted the flask clamps will ordinarily be left in their inoperative position until the board is applied at station III.

The operator at station II introduces molding material into the flask, the molding material most commonly used being, of course, sand, although any other suitable molding material may be employed. The molding material may be fed into the flask in any convenient way, one way of doing this being to supply it through a chute from an overhead bin, the bin having an outlet valve controllable by the operator at station II.

The operator at station II also operates the jolting mechanism to jolt the molding material to form the mold against the pattern and within the flask. The mold may be formed otherwise than by jolting, as for example, by squeezing the molding material against the pattern or by slinging the molding material against the pattern, these methods both being well known in the art. In any event, station II is the station at which the mold is formed by packing the molding material against the pattern, whether the packing be accomplished by jolting, squeezing or slinging.

The operator at station III first strikes off the molding material, i. e., moves a straight edge across the top of the flask to push off any molding material which may be standing above the level of the top of the flask. If the flask has as integral portions of it means for automatically retaining the molding material in place when the flask is inverted no board is applied. In this case, as above explained in connection with the description of the duties of the operator at station I, the flask clamps will normally have been rendered operative at station I, but if not they will be rendered operative at station III, assuming, of course, that the mold being made is a drag mold and that the rollover plate carrying the mold is to be inverted. If the mold being made is a cope mold and is to be removed at station III there is no necessity of employing the flask clamps at all. If a board is required it is applied over the flask by the operator at station III and the operator then renders operative the flask clamps to clamp the board against the flask and the flask against the rollover plate. Such a board is shown at 197'. The operator then inverts the rollover plate, preparing it for movement to station IV where the mold is drawn from the pattern. If the mold being made is a cope mold that mold is simply drawn or stripped from the pattern by raising the flask and mold upwardly by means of the pins 200 (Figure 14) as above explained, after which the mold is removed by any suitable means.

When a cope mold has been made and has been removed at station III the rollover plate is empty as it passes to station IV, in which case no operation on that particular rollover plate is performed at station IV. In the form of mechanism illustrated the operator at station III should invert the rollover plate at that station after the cope mold has been removed therefrom so as to avoid the possibility of the uninverted rollover plate striking the standards 234 as it moves to station IV.

The operator at station IV when a drag mold is being made moves the head 243 upwardly to engage the flask, renders inoperative the flask clamps and draws the flask and mold from the pattern. The flask is deposited on the conveyor 246 on which it is delivered for use. When the turret rises it picks up the rollover plate with the pattern thereon which has been supported by the standards 234 at station IV and delivers the same to station I.

Thus it is seen that each of the four operators has certain duties to perform. He must perform those duties while the turret is down. As soon as he has completed the performance of his duties the turret may, so far as he is concerned, rise in the succeeding movement.

I provide automatic control mechanism for controlling operation of the turret and insuring its upward movement, rotary movement and downward movement when the operations at the various stations have been concluded. The control mechanism preferably includes four manually operable switches, one at each of stations I, II, III and IV, each operator operating the switch at his station after he has completed his duties with respect to any particular mold, the mechanism functioning to raise, turn and lower the turret only when all four operators have operated their switches. The switches may, for example, be of the push button operated type. Each operator pushes his button as soon as he has completed his duties, but nothing happens until the last of the four operators has pushed his button, when the turret is automatically caused to rise, turn to advance the molds one station and lower to position each mold at the next succeeding station.

Figure 33 is a wiring diagram of the control mechanism. The four switches to be operated by the respective operators are designated, respectively, 247, 248, 249 and 250. Each of these four switches is of the push-button type, the switch being urged toward open position by a spring so that it remains closed only during the interval while the button is being pressed. Switches 247, 248, 249 and 250 are connected in parallel between line 251 and line 252. In addition line 253 connects line 251 with line 254. Lines 252 and 254 are also connected with other switches and relays, as clearly shown in Figure 33, and the operation of which will now be described. Three phase current is supplied through leads 255, 256 and 257. Lead 255 is connected with line 254 and lead 256 is connected with line 252. Switch 258 is disposed in line 253.

Limit switch 258 is one of three rotary limit switches mounted in the base 9 and which are operable through gear 42a (Figure 5), which meshes with rack 42, upon turning of the turret 2 relatively to the base 9. The other two rotary limit switches are switches 298 and 299 presently to be referred to. Switch 258 is initially closed. When switch 247 is closed line 254 is connected momentarily to line 252 and current passing through the coil of relay 259 disposed between switch 247 and line 252 closes three contacts 260, 261 and 262. The closed contact 260 maintains the circuit from line 251 to line 252 through line 263 even after switch 247 is opened by its spring after the button has been pressed and released by the operator at station I. An indicator 264 in line 263, as, for example, a light, makes a positive indication after the operator has pushed the button of switch 247. Thus if the operator forgets whether or not he has pushed the button he can ascertain this from the indicator 264.

Similar control mechanisms are connected with each of the other three switches 248, 249 and 250. Relay 265, which is energized upon the closing of switch 248, closes contacts 266, 267 and 268. The closed contact 266 maintains the circuit from line 251 to line 252 through line 269 and indicator 270. Relay 271, which is energized upon the closing of switch 249, closes contacts 272, 273 and 274. The closed contact 272 maintains the circuit from line 251 to line 252 through line 275 and indicator 276. Relay 277, which is energized upon the closing of switch 250, closes contacts 278, 279 and 280. The closed contact 278 maintains the circuit from line 251 to line 252 through line 281 and indicator 282.

From the above description it will be seen that when all four of the operators have pushed their buttons to close switches 247, 248, 249 and 250 contacts 261, 267, 273 and 279 are all closed and a series circuit is completed from line 254 to line 252 through line 283, energizing relay 284. The relay 284 closes contact 285 and opens contact 286. At 287 is shown a transformer for reducing the voltage from 220 volts at the leads 255, 256 and 257 to 110 volts in the portion of the circuit disposed below the transformer in Figure 33. Closing of contact 285 completes a circuit from line 288 to line 289 and energizes solenoid 290, which opens a compressed air control valve to admit compressed air to the pipe 27a and air inlets 27 (see Figures 4 and 29), resulting in elevating the turret 2. In short, the moment that the last of the four switches 247, 248, 249 and 250 is operated the circuit is closed through the solenoid 290 and the compressed air is admitted to the hollow pistons 7 in the cylinders 5, 6 and the turret 2 begins to rise.

As the turret rises and nears its uppermost position it operates limit switch 29 to close the circuit in line 292 between lines 252 and 254, thereby energizing the motor starter coil 293 which closes the contacts 294, 295, 296 and 297. Closing of the contacts 295, 296 and 297 results in the supply of three-phase current to the motor 43 which rotates the turret. The instant the motor starts the magnetic brake 60 is released. The contact 294 maintains the circuit between line 252 and line 254 after contacts 262, 268, 274 and 280 open. Limit switch 298 closes before limit switch 258 opens and thus is accomplished the adjustment by which rotation of the turret is controlled by shutting off the motor at the proper point. When switch 298 opens the circuit from line 254 to line 252 is interrupted and contacts 295, 296 and 297 open and the brake 60 is closed to decelerate the turret to a stop 90° from its starting point.

At the instant switch 258 opens contacts 261, 267, 273 and 279 open and the coil 284 is deenergized, resulting in opening contact 285 and closing contact 286. The opening of contact 285 shuts off the supply of compressed air to the elevating cylinder. As the turret nears its objective rotary position limit switch 299 closes, completing the circuit between line 254 and line 252 and energizing the coil of relay 300 which, in turn, closes contact 301, completing the circuit between line 288 and line 289 and actuating solenoid 302 to open the exhaust and permit escape of the air. Thus the turret descends, completing the cycle.

At the instant the rising turret contacts limit switch 29 the circuit between lines 254 and 252 is completed through switch 303 and solenoid 304. Also a circuit is completed between lines 254 and 252 between the switch 305 and solenoid 306.

The solenoids 304 and 306 operate the valves 184a and 225a bringing about rotation through 180° of the rollover plate inverting members 159 and 204 to bring those members into position to invert the rollover plates cooperating therewith in the succeeding cycle. When contact 29 opens as the turret starts to descend the two solenoids are spring returned without operating the valves. After the turret descends the switches 303 and 305 are manually operated to again complete circuits between lines 254 and 252, operating the two solenoids 304 and 306 to invert the rollover plates at stations I and III. The solenoids 304 and 306 are of the type incorporating a ratchet and rotating disk and having no neutral position. Pressure is always on one end of the rollover piston while the other end is open to exhaust. When one of these solenoids is energized momentarily the moving part is rotated 180° and the ratchet is spring returned but the valve position does not change. To change the valve position the solenoid is again momentarily energized and the moving part is again rotated 180°, returning to its original position.

Features described but not claimed in this application are claimed in my copending divisional applications Serial Nos. 647,515, 647,516 and 647,517.

Application Serial No. 647,517, filed February 14, 1946, is now abandoned.

While I have shown and described a present preferred embodiment of the invention it is to be distinctly understood that the invention is not limited thereto but may be otherwise variously embodied within the scope of the following claims.

I claim:

1. A molding machine comprising a carrier, a plurality of supports adapted to be carried by the carrier, a plurality of operating stations at which the carrier is adapted successively to position the respective supports, means at one station for packing mold forming material against a pattern in a flask supported by a support to form a mold, means at a second station for separating the mold and flask from the support and pattern, means also at the second station for inverting the assembly of support, flask, pattern and mold when it is desired to deliver the mold in inverted position and means at a third station for separating the mold and flask from the support and pattern when the mold is delivered thereto in inverted position.

2. A molding machine comprising a carrier, a plurality of supports adapted to be carried by the carrier, a plurality of operating stations, means for moving the carrier to successively position the respective supports at the respective stations, means for moving the carrier transversely of the direction of said first mentioned movement, means at one station for packing mold forming material against a pattern supported by a support to form a mold, means at a second station for inverting the support, mold and pattern, a fixed mounting at a third station, means fixedly attached to said mounting for receiving and supporting the inverted support so that the support is out of contact with the carrier and means also mounted in fixed position at the third station for lowering the mold away from the support and pattern while the support is thus supported.

3. A molding machine comprising a carrier, a plurality of supports adapted to be carried by the carrier, a plurality of operating stations, means for moving the carrier to successively position the respective supports at the respective stations, means for moving the carrier transversely of the direction of said first mentioned movement, means at one station for packing mold forming material against a pattern supported by a support to form a mold, means at a second station for inverting the support, mold and pattern, a fixed mounting at a third station, means fixedly attached to said mounting for receiving and supporting the inverted support so that the support is out of contact with the carrier, means also mounted in fixed position at the third station for lowering the mold away from the support and pattern while the support is thus supported and means at a fourth station for reinverting the support.

4. A molding machine comprising a carrier, a trunnioned support adapted to be carried by the carrier through the trunnions thereof, the carrier being movable transversely of the axis of the trunnions of the support toward and from an operating station to position the support at that station and remove the same therefrom, a flat-faced portion connected with one of the trunnions of the support, the flat face of said portion being positioned in a plane parallel to the direction of movement of the carrier toward and from the operating station, and movable locking means on the carrier adapted to engage said face to hold the support against turning about the axis of its trunnions and adapted to be moved to inoperative position out of engagement with said portion to permit the support to turn about the axis of its trunnions.

5. A molding machine comprising a carrier, a trunnioned support adapted to be carried by the carrier through the trunnions thereof, the carrier being movable transversely of the axis of the trunnions of the support toward and from an operating station to position the support at that station and remove the same therefrom, the support having a generally radial projection extending from one of its trunnions generally parallel to the direction of movement of the carrier toward and from the operating station, and movable locking means on the carrier mounted beside the path of movement of said projection in position to engage said projection to hold the support against turning about the axis of its trunnions and adapted to be moved to inoperative position out of engagement with said projection to permit the support to turn about the axis of its trunnions.

6. A molding machine comprising a carrier, a plurality of supports adapted to be carried by the carrier, a plurality of operating stations, means for moving the carrier to successively position the respective supports at the respective stations, means for moving the carrier transversely of the direction of said first mentioned movement, means at one station for packing mold forming material against a pattern supported by a support to form a mold, means at a second station for inverting the support, mold and pattern, a fixed mounting at a third station, a plurality of standards fixedly attached to said mounting for receiving and supporting the inverted support so that the support is out of contact with the carrier and means also mounted in fixed position at the third station for lowering the mold away from the support and pattern while the support is supported by said standards.

7. A molding machine comprising a carrier, a trunnioned support adapted to be carried by the carrier through the trunnions thereof, the carrier being movable toward and from an operating station to position the support at that station and remove the same therefrom, means on the carrier normally holding the support against turning about the axis of its trunnions and means at said station engaging said holding means during movement of the carrier toward said station to render inoperative said holding means.

8. A molding machine comprising a carrier, a trunnioned support adapted to be carried by the carrier through the trunnions thereof, the carrier being movable toward and from an operating station to position the support at that station and remove the same therefrom, the support having a projection extending therefrom in a direction generally parallel to the axis of a trunnion thereof through which it may be turned about the axis of its trunnions, means permanently located at said station engageable with the projection when the support is positioned thereat and means for turning said last mentioned means to turn the support about the axis of its trunnions.

9. A molding machine comprising a carrier, a trunnioned support adapted to be carried by the carrier through the trunnions thereof, the carrier being movable toward and from an operating station to position the support at that station and remove the same therefrom, the support having a projection extending therefrom in a direction generally parallel to the axis of a trunnion thereof, movable locking means on the carrier adapted to engage the projection to hold the support against turning about the axis of its trunnions and adapted to be moved to inoperative position out of engagement with the projection to permit the support to turn about the axis of its trunnions and means at said station cooperable with the projection when the support is positioned thereat to turn the support about the axis of its trunnions.

10. A molding machine comprising a carrier, a trunnioned support adapted to be carried by the carrier through the trunnions thereof, the carrier being movable toward and from an operating station to position the support at that station and remove the same therefrom, the support having a projection extending therefrom in a direction generally parallel to the axis of a trunnion thereof, and a rotatable slotted head at said station, the projection being adapted to enter the slot in said head when the carrier moves toward said station to position the support thereat whereby the support may be turned about the axis of its trunnions upon rotation of said head.

11. A molding machine comprising a carrier, a support for a pattern and flask carried by the carrier, means for inverting the support, means for operating the carrier to lower the inverted support, a three-point precision positioning device fixedly positioned beneath the support in the path of the portion of the support which is outside the flask receiving the inverted support upon its being lowered to position the same accurately with respect to the direction of drawing of the pattern from the flask and means for lowering the flask away from the pattern to draw the pattern while the support is so positioned.

LOYAL L. JOHNSTON.

REFERENCES CITED

The following references are of record in the file of this patent:

UNITED STATES PATENTS

| Number | Name | Date |
|---|---|---|
| 754,495 | Penrose | Mar. 15, 1904 |
| 1,006,443 | Davis | Oct. 17, 1911 |
| 1,131,145 | Lang | Mar. 9, 1915 |
| 1,134,397 | McCarte | Apr. 6, 1915 |
| 1,285,417 | Schultze | Nov. 19, 1918 |
| 1,376,129 | Abigt | Apr. 26, 1921 |
| 1,470,402 | Stoney | Oct. 9, 1923 |
| 1,506,876 | Wood | Sept. 2, 1924 |
| 1,570,658 | Wickland et al. | Jan. 26, 1926 |
| 1,865,434 | Eggert | July 5, 1932 |
| 1,905,358 | Zimmerman | Apr. 25, 1933 |
| 2,012,478 | Oyster | Aug. 27, 1935 |
| 2,047,209 | Lawlor | July 14, 1936 |
| 2,049,967 | Luton | Aug. 4, 1936 |
| 2,112,830 | Corbin | Apr. 5, 1938 |